(12) United States Patent
Hosotani et al.

(10) Patent No.: US 10,348,395 B2
(45) Date of Patent: Jul. 9, 2019

(54) COMMUNICATION STATION, SATELLITE COMMUNICATION SYSTEM, GROUND STATION, CHANNEL CONTROL DEVICE, AND SATELLITE COMMUNICATION METHOD

(71) Applicant: MITSUBISHI ELECTRIC CORPORATION, Chiyoda-ku (JP)

(72) Inventors: Yasuo Hosotani, Chiyoda-ku (JP); Makiko Hiragi, Chiyoda-ku (JP); Masanori Torii, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/114,736

(22) PCT Filed: Feb. 5, 2015

(86) PCT No.: PCT/JP2015/053242
§ 371 (c)(1),
(2) Date: Jul. 27, 2016

(87) PCT Pub. No.: WO2015/122348
PCT Pub. Date: Aug. 20, 2015

(65) Prior Publication Data
US 2016/0365918 A1    Dec. 15, 2016

(30) Foreign Application Priority Data

Feb. 13, 2014 (JP) ................. 2014-025583

(51) Int. Cl.
*H04B 7/185* (2006.01)
*H04W 72/04* (2009.01)

(52) U.S. Cl.
CPC ..... *H04B 7/18513* (2013.01); *H04B 7/18526* (2013.01); *H04W 72/0406* (2013.01)

(58) Field of Classification Search
CPC .......... H04B 7/18513; H04B 7/18526; H04W 72/0406
See application file for complete search history.

(56) References Cited

U.S. PATENT DOCUMENTS 4,273,962 A * 6/1981 Wolfe ................... H04M 15/12
379/115.01
4,995,096 A   2/1991 Isoe
(Continued)

FOREIGN PATENT DOCUMENTS

JP    10-51370 A    2/1988
JP    63-42448 B2   8/1988
(Continued)

OTHER PUBLICATIONS

Office Action dated Feb. 12, 2018 in German Patent Application No. 11 2015 000 796.2 with English translation.
(Continued)

*Primary Examiner* — Alex Skripnikov
*Assistant Examiner* — Sharmin Chowdhury
(74) *Attorney, Agent, or Firm* — Oblon, McClelland, Maier & Neustadt, L.L.P.

(57) ABSTRACT

A satellite communication system includes: a communication station generator communicator, a plurality of ground stations receiver transmitter receiver, and a channel control device having a satellite communication channel assignor configured to assign one satellite communication channel in response to channel assignment requests received from the plurality of ground stations via the ground network and determined to be identical communicator.

19 Claims, 24 Drawing Sheets

(56) References Cited

U.S. PATENT DOCUMENTS

| | | | | |
|---|---|---|---|---|
| 5,918,157 A * | 6/1999 | Wiedeman | ......... | H04B 7/18539 |
| | | | | 370/316 |
| 2002/0072853 A1 * | 6/2002 | Sullivan | ................ | G01S 5/0036 |
| | | | | 701/485 |
| 2006/0252367 A1 * | 11/2006 | Haartsen | ............... | H04B 7/2606 |
| | | | | 455/11.1 |
| 2006/0268961 A1 * | 11/2006 | Prestwich | ............ | G01C 21/206 |
| | | | | 375/146 |
| 2009/0111465 A1 * | 4/2009 | Bruno | .................. | G08G 5/0008 |
| | | | | 455/431 |
| 2010/0023419 A1 * | 1/2010 | Tyler | .................. | G06Q 30/0601 |
| | | | | 705/26.1 |
| 2014/0161024 A1 * | 6/2014 | Speight | ............. | H04W 74/0833 |
| | | | | 370/315 |

FOREIGN PATENT DOCUMENTS

| | | |
|---|---|---|
| JP | 63-209329 A | 8/1988 |
| JP | 01-180133 A | 7/1989 |
| JP | 2000-307500 A | 11/2000 |
| WO | WO 98/42143 A2 | 9/1998 |
| WO | 2006/035707 A1 | 4/2006 |
| WO | WO 2013/027015 A1 | 2/2013 |

OTHER PUBLICATIONS

International Search Report dated Mar. 24, 2015 for PCT/JP2015/053242 filed on Feb. 5, 2015.
Office Action dated Jul. 2, 2018 in Chinese Patent Application No. 201580008685.7, with English-language translation, 33 pages.

* cited by examiner

FIG.4
(a)
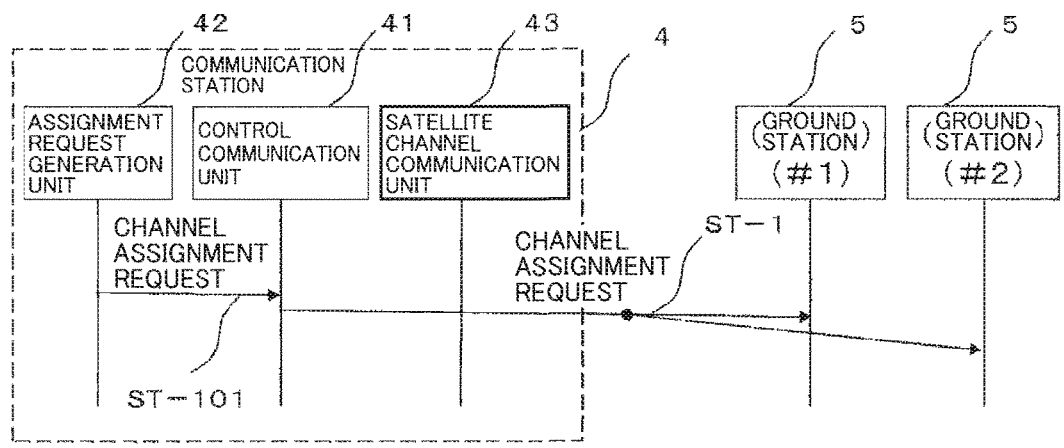
(b)
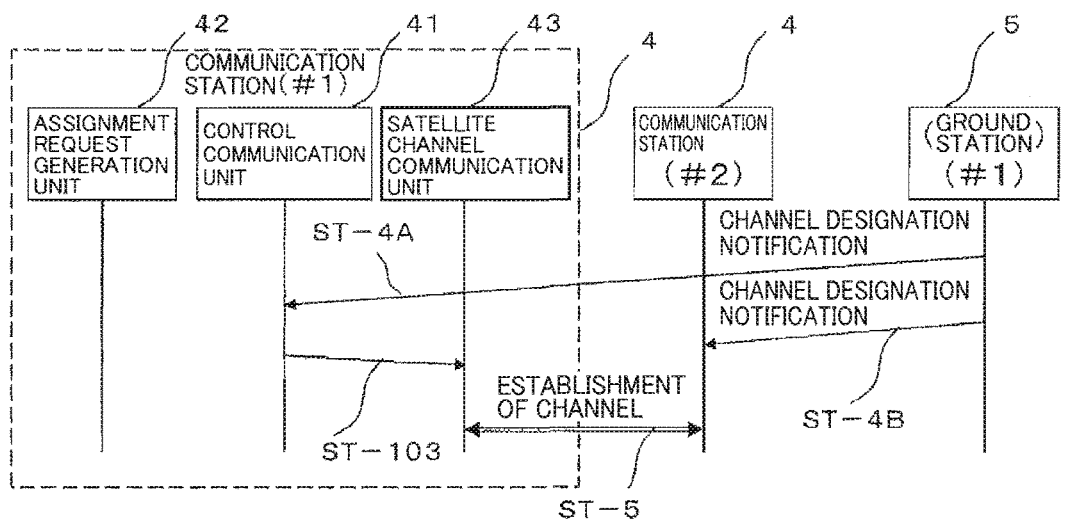

FIG.5
(a)
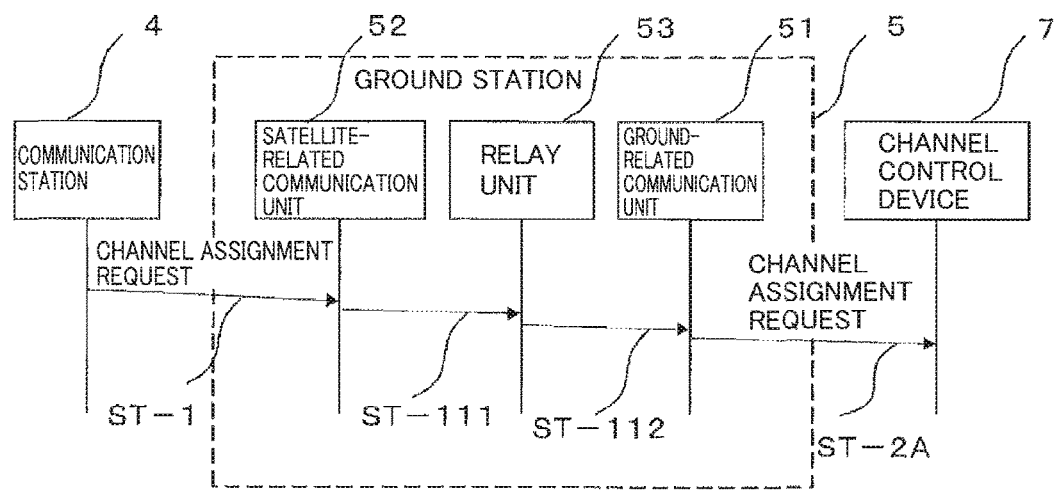
(b)
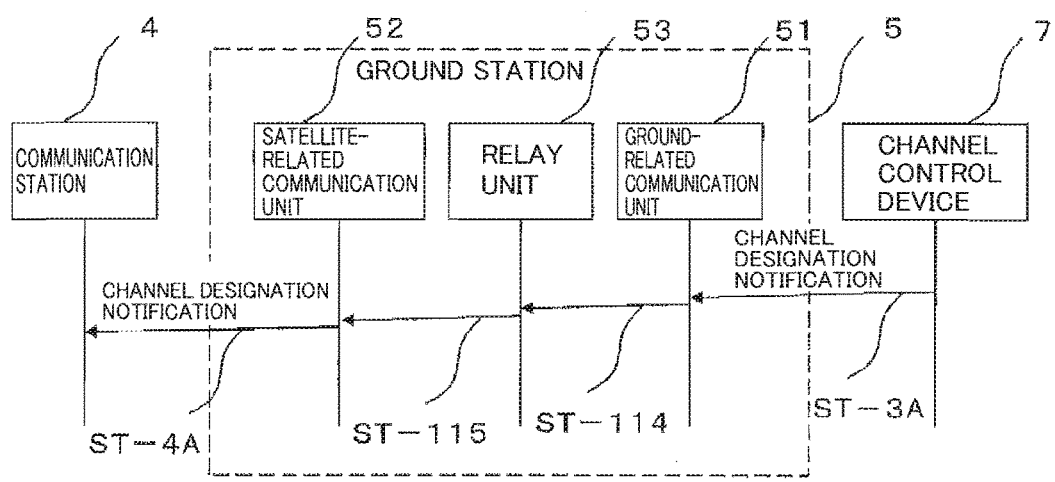

FIG.14
(a)
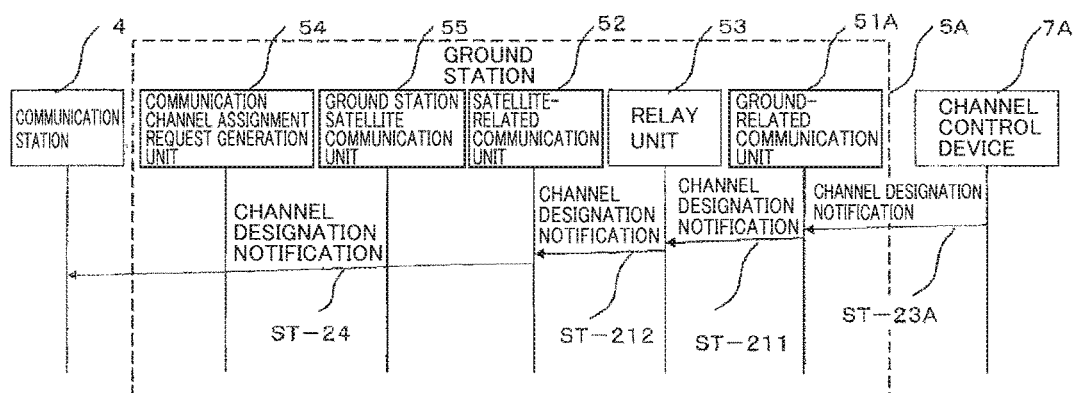
(b)
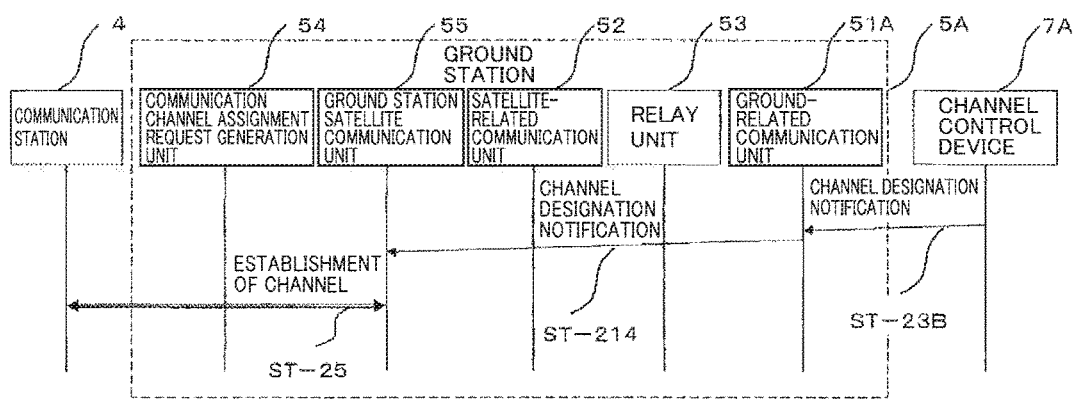

FIG.20
(a)
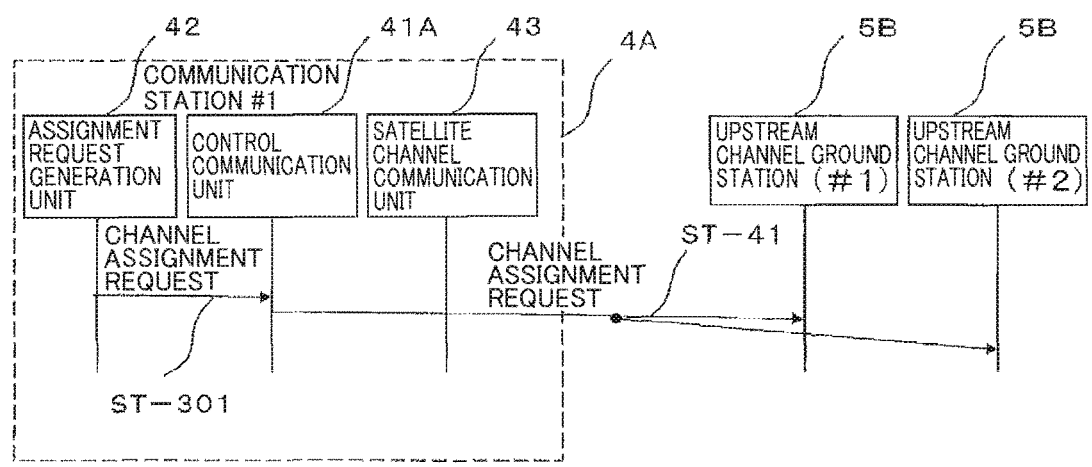
(b)
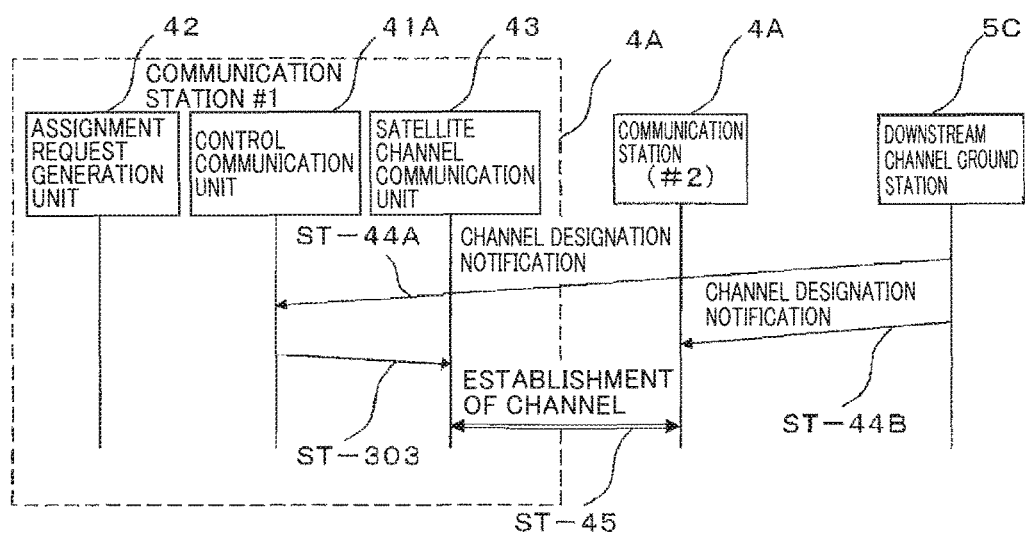

FIG.21
(a)
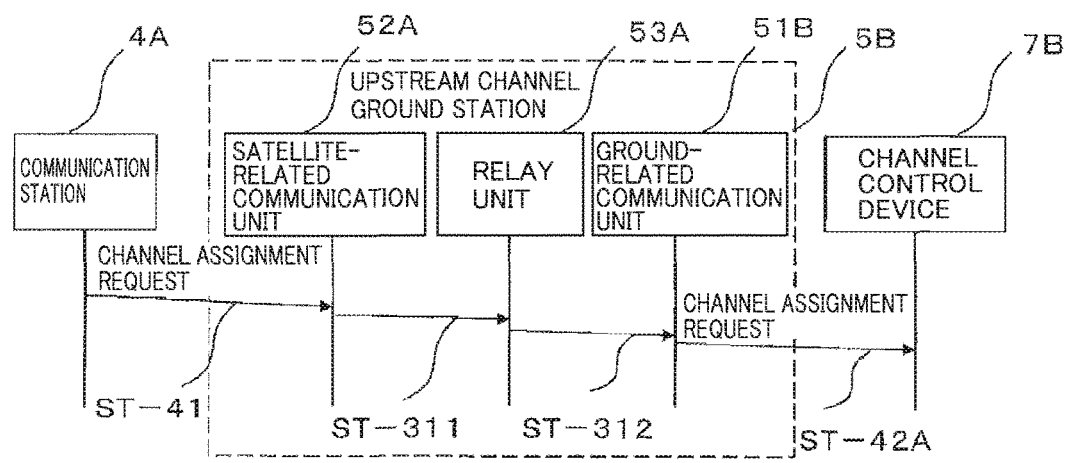
(b)
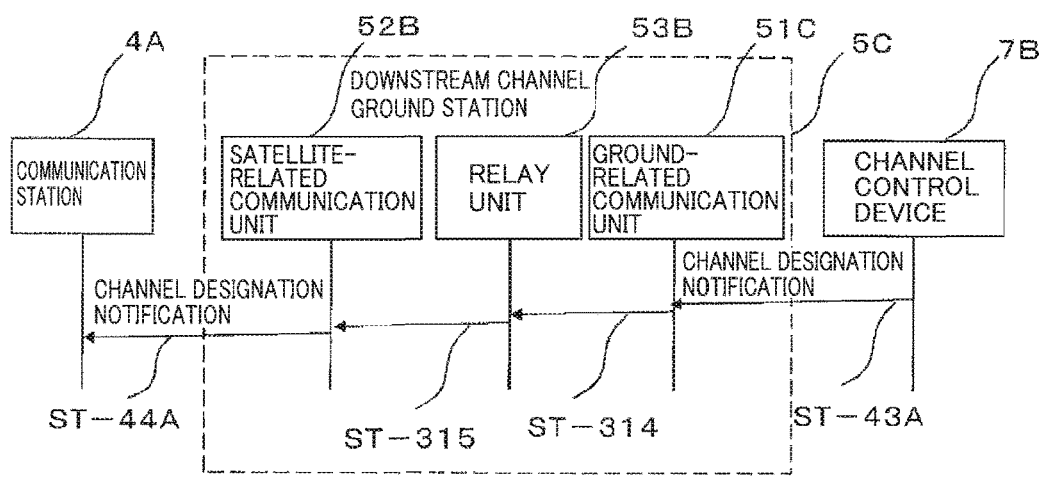

COMMUNICATION STATION, SATELLITE
COMMUNICATION SYSTEM, GROUND
STATION, CHANNEL CONTROL DEVICE,
AND SATELLITE COMMUNICATION
METHOD

TECHNICAL FIELD

The present disclosure relates to a communication station, a satellite communication system, a ground station, a channel control device, and a satellite communication method, with each of which satellite communication is performed via a satellite in accordance with a demand assignment multiple access scheme.

BACKGROUND ART

Satellite communication has a role as communication means for emergency in the event of occurrence of disaster. Hence, the following matters need to be taken into consideration: availability of communication even in a disaster-affected area where a ground network is disconnected; and avoidance of unavailability of the whole of satellite communication network due to a local disaster. Moreover, satellite communication needs to satisfy requirements such as: requirements in extensive and public aspects; requirements to achieve establishment of communication based on a special characteristic of remote wireless communication; and requirements to effectively utilize limited, expensive channels at maximum. A demand assignment multiple access scheme (hereinafter, abbreviated as "DAMA scheme") in satellite communication is one of schemes for satisfying these requirements for the satellite communication. The DAMA scheme is a scheme for effectively utilizing a satellite communication channel by a plurality of child stations. In the DAMA scheme, in order to appropriately assign a communication channel for communication between child stations or communication between a child station and a parent station, a child station issues an assignment request for communication channel through a control channel (referred to as "CSC channel") different from the communication channel. A parent station receives this channel assignment request, and assigns a communication channel (see Patent Document 1, for example). In a satellite communication method according to the DAMA scheme, the following functions needs to be constructed as functions of the parent station: a function of managing a communication state of a child station and a state of use of satellite channel and appropriately assigning a channel in accordance with a request from the child station; and a communication function of notifying a result of the channel assignment to the child station. In the conventional satellite communication method according to the DAMA scheme, a large-scale transmission/reception facility and a channel control device are incorporated in the parent station. The large-scale transmission/reception facility is configured to include CSC channels permitting transmission/reception of channel control signals from all the child stations. The channel control device is configured to manage a satellite channel.

CITATION LIST

Patent Document

PTD 1: Japanese Patent Laying-Open No. 10-51370 (FIG. 1)

SUMMARY OF INVENTION

Technical Problem

Due to the above-described configuration in the conventional satellite communication method according to the DAMA scheme, the function of controlling channels in the DAMA scheme will be lost if the parent station becomes unusable due to a disaster or the like. This may result in unavailability of the whole of satellite communication network. Moreover, in order to deal with the case where the parent station becomes unusable due to a disaster or the like, a large amount of cost is required to achieve redundancy by constructing a spare parent station in which a large-scale transmission/reception facility and a channel control device configured to manage satellite channels are incorporated.

The present disclosure has been made to solve the above problem, and has an object to provide a communication station, a satellite communication system, a ground station, a channel control device, and a satellite communication method, by each of which redundancy can be provided to respective configurations necessary for management of satellite communication channel in the DAMA scheme and communication can be continued through a satellite communication channel even in the event of a disaster.

Solution to Problem

A communication station according to the present disclosure includes: an assignment request generator configured to generate a channel assignment request to request assignment of a satellite communication channel for communication with a counterpart communication station via a satellite; a control communicator configured to transmit the channel assignment request to each of a plurality of ground stations through a satellite control channel via the satellite, the plurality of ground stations being connected to a channel control device via a ground network, the channel control device being configured to assign the satellite communication channel; and a satellite channel communicator configured to communicate with the counterpart communication station through the satellite communication channel assigned and notified in response to the channel assignment request received by the channel control device via each of the plurality of ground stations.

A satellite communication system according to the present disclosure includes: a communication station having (i) an assignment request generator configured to generate a channel assignment request to request assignment of a satellite communication channel for communication with a counterpart communication station via a satellite, (ii) a control communicator configured to transmit the channel assignment request through a satellite control channel via the satellite, and (iii) a satellite channel communicator configured to communicate through the satellite communication channel assigned and notified in response to the channel assignment request; a plurality of ground stations, each of the plurality of ground stations having (i) a satellite-related receiver configured to receive the channel assignment request from the communication station through the satellite control channel, and (ii) a ground-related transmitter configured to transmit, via a ground network, the channel assignment request received by the satellite-related receiver; and a channel control device having (i) a channel control communicator configured to communicate with the plurality of ground stations via the ground network, and (ii) a satellite communication channel assignor configured to determine whether or not channel assignment requests received from the plurality of ground stations by the channel control communicator are identical, and configured to assign one satellite communication channel in response to a set of the channel assignment requests determined to be identical.

A ground station according to the present disclosure is one of a plurality of ground stations. Each of the plurality of ground stations is configured to receive a channel assignment request through a satellite control channel via a satellite, the channel assignment request being made by a communication station to request assignment of a satellite communication channel for communication with a counterpart communication station via the satellite. Each of the plurality of ground stations is configured to transmit the received channel assignment request to a channel control device via a ground network, the channel control device being configured to assign the satellite communication channel in response to the channel assignment request. The ground station includes: a satellite-related communicator configured to receive the channel designation notification from the communication station through the satellite control channel; and a ground-related communicator configured to transmit the channel designation notification received by the satellite-related communicator to the channel control device via the ground network.

A channel control device according to the present disclosure includes: a channel control communicator configured to receive and communicate, via a ground network, channel assignment requests received by a plurality of ground stations connected thereto via the ground network, each of the channel assignment requests being originated from a communication station to request assignment of a satellite communication channel for communication with a counterpart communication station via a satellite; and a satellite communication channel assignor configured to determine whether or not the channel assignment requests received by the channel control communicator are identical, and configured to assign one satellite communication channel in response to a set of the channel assignment requests determined to be identical.

A satellite communication method according to the present disclosure includes the steps of: transmitting, by a communication station, a channel assignment request through a satellite control channel via a satellite, the channel assignment request being made to request assignment of a satellite communication channel for communication with a counterpart communication station via the satellite; receiving, by each of a plurality of upstream ground stations, the channel assignment request through the satellite control channel, the plurality of upstream ground stations being connected to a channel control device via a ground network, the channel control device being configured to assign the satellite communication channel; transmitting, by the plurality of upstream ground stations, the received channel assignment requests to the channel control device via the ground network; determining, by the channel control device, whether or not the channel assignment requests received from the plurality of upstream ground stations are identical, and assigning, by the channel control device, one satellite communication channel in response to a set of the channel assignment requests determined to be identical; generating, by the channel control device, a channel designation notification for notifying channel information about the assigned satellite communication channel to the communication station and transmitting, by the channel control device, the generated channel designation notification to a downstream channel ground station connected thereto via the ground network; transmitting, by the downstream channel ground station, the channel designation notification received from the channel control device, to each of the communication station and the counterpart communication station through the satellite control channel; and receiving the channel designation notification by each of the communication station and the counterpart communication station, and communicating, by the communication station, with the counterpart communication station through the satellite communication channel designated by the channel designation notification.

Advantageous Effects of Invention

According to the present disclosure, the management of satellite communication channel in the DAMA scheme is distributed among the channel control device and the plurality of ground stations connected thereto via the ground network, whereby redundancy can be provided to the respective configurations necessary for the management of satellite communication channel and communication can be continued even if one channel control device or ground station becomes unusable.

BRIEF DESCRIPTION OF DRAWINGS

FIG. 4 is a sequence diagram for satellite communication channel connection for a communication station in the satellite communication system according to the first embodiment of the present disclosure.

FIG. 5 is a sequence diagram for satellite communication channel connection for a ground station in the satellite communication system according to the first embodiment of the present disclosure.

FIG. 14 is a sequence diagram for satellite communication channel connection for the ground station in the satellite communication system according to the second embodiment of the present disclosure.

FIG. 20 is a sequence diagram for satellite communication channel connection for a communication station in the satellite communication system according to the third embodiment of the present disclosure.

FIG. 21 is a sequence diagram for satellite communication channel connection for a ground station in the satellite communication system according to the third embodiment of the present disclosure.

DESCRIPTION OF EMBODIMENTS

First Embodiment

Figure 1:
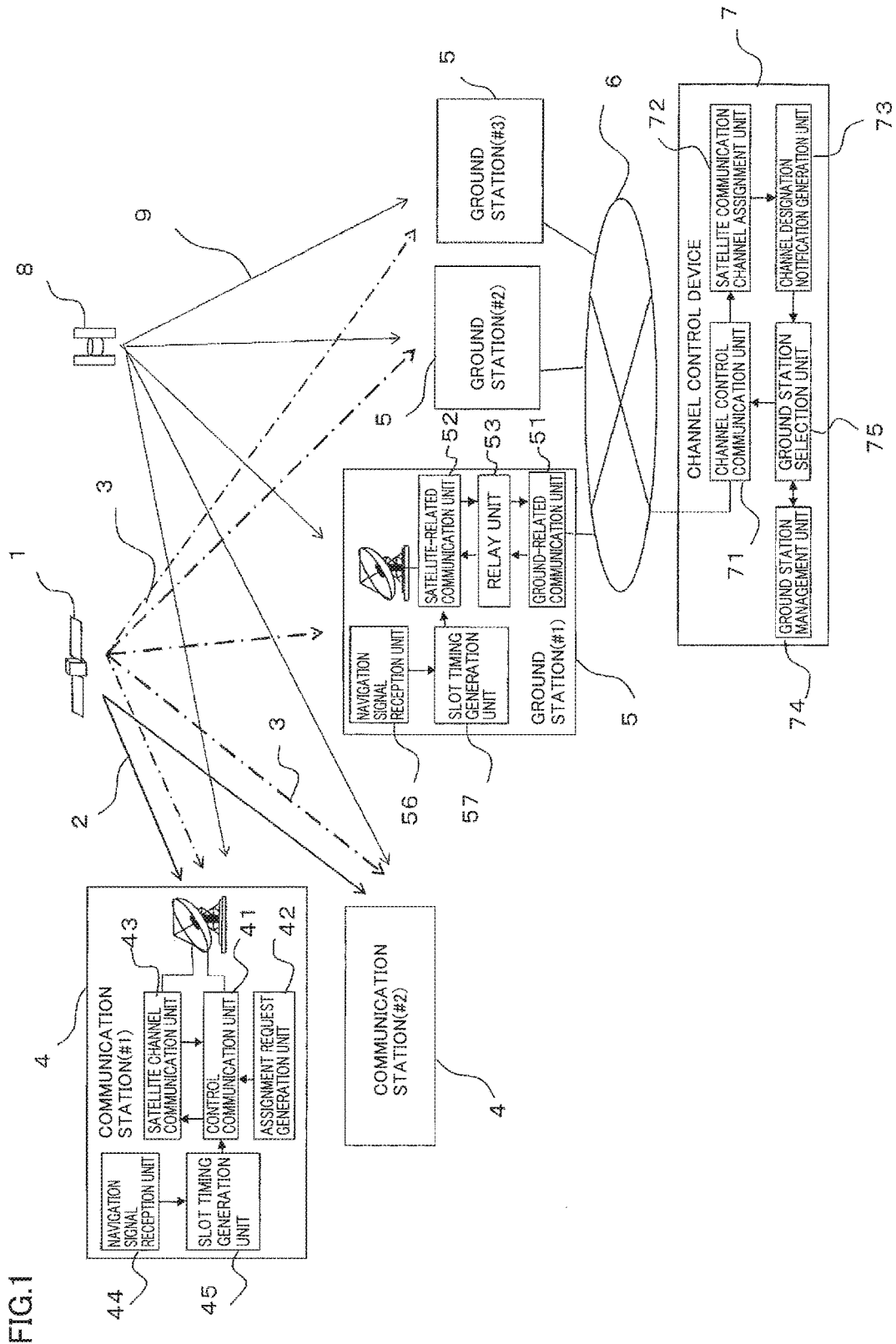
FIG. 1 shows a configuration of a satellite communication system according to a first embodiment of the present disclosure.

FIG. 1 shows a configuration of a satellite communication system according to a first embodiment of the present disclosure. The satellite communication system according to the first embodiment of the present disclosure includes: a plurality of communication stations 4 (also referred to as "earth stations") configured to communicate with one another through a satellite communication channel 2 via a satellite 1, which is a communication satellite; a plurality of ground stations 5 configured to communicate with communication stations 4 through a satellite control channel 3; and a channel control device 7 configured to communicate with the plurality of ground stations 5 via a ground network 6. Moreover, although not shown in FIG. 1, a computer having the same function as that of channel control device 7 is connected to the ground network as a backup of channel control device 7. It should be noted that FIG. 1 illustratively shows two communication stations 4 and three ground stations 5; however, the number of communication stations 4 and the number of ground stations 5 are not limited to those in FIG. 1 and may be any numbers. It should be noted that satellite communication channel 2 is a communication channel for communication between communication stations 4 via satellite 1. Assignment or release of satellite communication channel 2 is controlled in accordance with a control signal transmitted and received through satellite control channel 3 that is provided via satellite 1 and separated from satellite communication channel 2. Satellite control channel 3 can be always used from communication stations 4 and ground stations 5.

In order to start communication through satellite communication channel 2, a communication station 4 transmits an assignment request for a satellite communication channel though satellite control channel 3. Reference characters #1 and #2 in the description below represent devices having the same configuration. For example, a communication station 4 (#1) and a communication station 4 (#2) represent two communication stations 4 having the same configuration. The same applies to ground stations 5. In the case of satellite communication channel 2 and satellite control channel 3, reference characters #1 and #2 also represent subdivided channels in different frequency bands as described below. A communication station 4 receives a channel designation notification, which is a response to an assignment request, through satellite control channel 3 and communicates with another communication station 4 through satellite communication channel 2 designated by the channel designation notification. For example, in order to start communication between communication station 4 (#1) and communication station 4 (#2) through satellite communication channel 2, one communication station 4 (#1) transmits an assignment request through satellite control channel 3 to request satellite communication channel 2 for communication with another communication station 4 (#2). Then, communication station 4 (#1) and communication station 4 (#2) receives channel designation notifications through satellite control channel 3 and communicate with each other through satellite communication channel 2 designated by the channel designation notifications.

Each of the plurality of ground stations 5 is connected to channel control device 7 via ground network 6. Each of communication stations 4 can communicate with any of ground stations 5 through satellite control channel 3. In particular, when service is required to be continued even if a ground station 5 connected to the satellite communication system becomes unusable due to a disaster or the like, a plurality of ground stations 5 are configured to communicate with communication stations 4. In the satellite communication system thus configured, even if one ground station 5 capable of communicating with a certain communication station 4 becomes unusable, another ground station 5 capable of communicating with that communication station 4 communicate therewith, thereby continuing the communication.

Moreover, each of the plurality of ground stations 5 can communicate with determined ones of the plurality of communication stations 4 through satellite control channel 3.

Hence, two different communication stations 4 may be capable of communicating with the same one ground station 5 or may be capable of communicating with respective different ground stations 5. Each of ground stations 5 relays between satellite control channel 3 and ground network 6. Ground station 5 receives an assignment request transmitted by a communication station 4 through satellite control channel 3 and including identification information. Then, ground station 5 adds time of reception of the assignment request thereto and transmits it to channel control device 7 via ground network 6. Moreover, ground station 5 receives a channel designation notification from channel control device 7 via ground network 6, and transmits the received channel designation notification to a communication station 4 through satellite control channel 3.

Channel control device 7 is constructed of a general-purpose computer or the like. Channel control device 7 is connected to each of ground stations 5 via the ground network. Moreover, since channel control device 7 is constructed of a general-purpose computer, a backup for failure of channel control device 7 can be provided by connecting a similar computer to ground network 6. A channel assignment request transmitted by a communication station 4 is received by each of the plurality of ground stations 5 through satellite control channel 3, and the plurality of ground stations 5 transmit the received channel assignment requests to channel control device 7 via ground network 6. Hence, from ground stations 5 connected to that communication station 4 through satellite control channel 3, channel control device 7 receives channel assignment requests identical to the channel assignment request originated from communication station 4.

Channel control device 7 determines that the received channel assignment requests are identical when the received channel assignment requests are originated from the same communication station 4 and a difference between respective times at which the ground stations receive the channel assignment requests falls within a certain range. Channel control device 7 assigns one satellite communication channel 2 in response to a set of the channel assignment requests determined to be identical. Channel control device 7 generates a channel designation notification for notifying assigned satellite communication channel 2. If the channel assignment request is made by communication station 4 (#1) to request satellite communication channel 2 for communication with communication station 4 (#2), channel designation notifications will be provided to communication station 4 (#1) and communication station 4 (#2). Since communication station 4 (#1) and communication station 4 (#2) will receive the channel designation notifications through satellite control channel 3, channel control device 7 selects one ground station 5 to communicate with communication station 4 (#1) and selects one ground station 5 to communicate with communication station 4 (#2), whereby the channel designation notifications can be transmitted to communication stations 4 via ground stations 5 thus selected, respectively.

A navigation satellite 8 is a satellite configured to transmit a navigation signal 9, such as a GPS (Global Positioning System) satellite. Navigation signal 9 from navigation satellite 8 is received by each of communication stations 4 and ground stations 5. Navigation signal 9 thus received is used to define a time slot for satellite control channel 3 used for communication from a communication station 4 to a ground station 5 or communication from a communication station 5 to a ground station 4. The time slot is common among communication stations 4 and ground stations 5, each of which utilizes satellite communication channel 3.

Unlike satellite communication channel 2 assigned when required, satellite control channel 3 can be always used, so that a plurality of communication stations 4 or a plurality of ground stations 5 may transmit signals through the same satellite control channel 3. For such a case, the time slot, which is a division of time with a certain interval, is provided such that transmitted signals do not interfere with one another among different communication stations 4 or different ground stations 5. Based on such a time slot, control signals are transmitted and received in accordance with a Slotted ALOHA communication scheme.

Each of communication stations 4 and ground stations 5 generates a timing that is in synchronization with time information obtained from navigation signal 9 received from navigation satellite 8 and that corresponds to start of the period of time slot. During the period of time slot starting at this timing, a control signal is transmitted from communication station 4 to ground station 5 through satellite control channel 3. Likewise, during the period of time slot starting at this timing, a control signal is transmitted from ground station 5 to communication station 4 through satellite control channel 3. It should be noted that the Slotted ALOHA communication scheme is the most suitable for a communication scheme employing satellite control channel 3 in view of (i) how frequent control signals are transmitted and received, (ii) the number of communication stations 4, and (iii) delay of communication. However, a TDMA (Time Division Multiple Access) scheme or other communication schemes, which employ a similar time slot, may be selected in the case where there are different requirements with regard to (i) how frequent control signals are transmitted and received, (ii) the number of communication stations, and (iii) delay of communication.

With reference to FIG. 1, the following describes each of the configurations of communication station 4, ground station 5, and channel control device 7, which perform the above-described respective functions in the satellite communication system. Communication station 4 includes a control communicator 41, an assignment request generator 42, a satellite channel communicator 43, a navigation signal receiver 44, and a slot timing generator 45. Navigation signal receiver 44 receives navigation signal 9 from navigation satellite 8. Based on time information obtained from navigation signal 9 received by navigation signal receiver 44, slot timing generator 45 generates a timing of starting a time slot in which control communicator 41 communicates with ground station 5 through satellite control channel 3. Control communicator 41 communicates with ground station 5 through satellite control channel 3 in accordance with the slot started with the timing signal generated by slot timing generator 45. Assignment request generator 42 generates a channel assignment request to request assignment of satellite communication channel 2 for communication with a counterpart communication station 4 (communication station 4 (#2) in the case of communication station 4 (#1)). The channel assignment request is transmitted by control communicator 41. Satellite channel communicator 43 is configured to perform communication through satellite communication channel 2; however, in that case, a communication channel to be used in satellite communication channel 2 is specified by channel information included in a channel designation notification received by control communicator 41.

Ground station 5 includes a ground-related communicator 51, a satellite-related communicator 52, a relay 53, a navigation signal receiver 56, and a slot timing generator 57. Navigation signal receiver 56 receives navigation signal 9 from navigation satellite 8. Based on time information obtained from navigation signal 9 received by navigation signal receiver 56, slot timing generator 57 generates a timing of starting a time slot in which satellite-related communicator 52 communicates with communication station 4 through satellite control channel 3. Ground-related communicator 51 is configured to communicate with channel control device 7 via ground network 6. Satellite-related communicator 52 is configured to communicate with communication station 4 through satellite control channel 3. Relay 53 is configured to relay a control signal between ground-related communicator 51 and satellite-related communicator 52. It should be noted that communication station 4 is configured to transmit/receive a control signal to/from channel control device 7 and is therefore connected to at least one ground station 5. In particular, communication station 4 is configured to be connected to a plurality of ground stations 5 in the case where service is required to be continued even if a ground station 5 connected to the satellite communication system becomes unusable due to a disaster or the like.

Channel control device 7 includes a channel control communicator 71, a satellite communication channel assignor 72, a channel designation notification generator 73, a ground station manager 74, and a ground station selector 75. Channel control communicator 71 communicates with the plurality of ground stations 5 via ground network 6. Satellite communication channel assignor 72 determines that channel assignment requests received from the plurality of ground stations 5 by channel control communicator 71 are identical when the received channel assignment requests are originated from the same communication station 4 and a difference between respective times of reception of the channel assignment requests falls within a certain range. Satellite communication channel assignor 72 assigns satellite communication channel 2 in response to the channel assignment requests determined to be identical. Channel designation notification generator 73 generates channel designation notifications to notify, to communication stations 4, channel information for the satellite communication channel assigned by satellite communication channel assignor 72.

For example, when channel control communicator 71 receives channel assignment requests to request satellite communication channel 2 for communication between communication station 4 (#1) and counterpart communication station 4 (#2) and satellite communication channel assignor 72 accordingly assigns satellite communication channel 2, channel designation notifications for notifying the result of assignment are addressed to communication station 4 (#1) and communication station 4 (#2). Ground station manager 74 records ground stations 5 that are to communicate with corresponding communication stations 4 through satellite control channel 3. Ground station selector 75 selects ground stations 5 to which channel control communicator 71 transmits the channel designation notifications.

Figure 2:
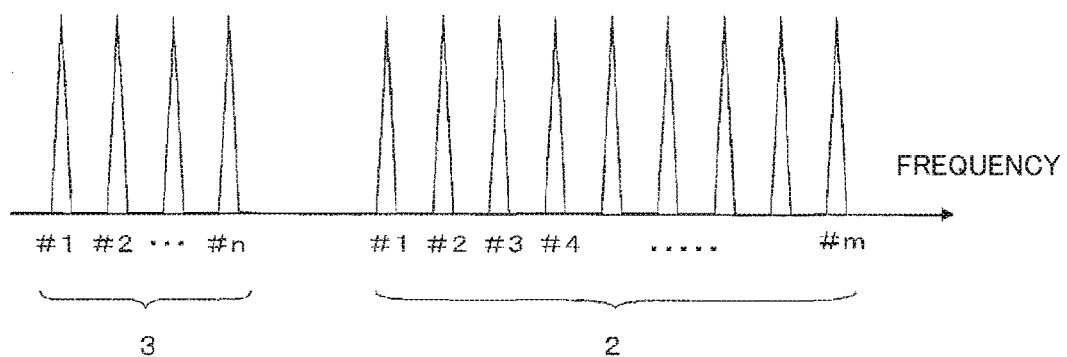
FIG. 2 shows respective configurations of a satellite communication channel and a satellite control channel in the satellite communication system according to the first embodiment of the present disclosure.

FIG. 2 shows respective configurations of the satellite communication channel and the satellite control channel in the satellite communication system according to the first embodiment of the present disclosure. As shown in FIG. 2, satellite communication channel 2 is constituted of subdivided channels as represented by #1 to #m. The subdivided channels occupy respective different frequency bands. Satellite communication channel 2 assigned in response to the channel assignment request and designated by the channel designation notification is one of these channels #1 to #m.

Satellite control channel 3 is constituted of subdivided channels as represented by #1 to #n. The subdivided channels occupy respective different frequency bands. Each communication station 4 transmits/receives a control signal through one of channels of frequency bands #1 to #n in satellite control channel 3. Moreover, through each of the frequency bands #1 to #n in satellite control channel 3, two or more ground stations 5 transmit/receive control signals. Each of ground stations 5 transmits/receives a control signal through one or more control channels of #1 to #n of satellite control channel 3. Control signals can be transmitted and received through satellite control channels of all the frequency bands #1 to #n included in satellite control channel 3 through which control signals are transmitted and received by the plurality of ground stations 5 connected to channel control device 7 via ground network 6.

By using satellite control channel 3 in this way, the satellite communication system can be configured such that each of communication stations 4 is connected to one or more of the plurality of communication stations 5 through satellite control channel 3 and each of ground stations 5 is connected to a plurality of communication stations 4 as described above. Meanwhile, there are the following two cases for two different communication stations 4: a case where two different communication stations 4 can communicate with the same one ground station 5 through the satellite control channel; and a case where two different communication stations 4 can communicate with respective different ground stations 5 through the satellite control channel. Examples of the case where different communication stations 4 can communicate with the same one ground station 5 through the satellite control channel include: a case where the same satellite control channel 3 is used, such as a case where two communication stations 4 use the same frequency band #1 of satellite control channel 3; and a case where two communication stations 4 use respective different frequency bands of satellite control channel 3 such as #1 and #2 of satellite control channel 3 and the same ground station 5 transmits and receives control signals through the respective frequency bands (#1 and #2) used by communication stations 4 in satellite control channel 3. Examples of the case where communication stations 4 can communicate with respective different ground stations 5 through the satellite control channel include: a case where two communication stations 4 use respective different frequency bands of satellite control channel 3 such as #1 and #2 of satellite control channel 3, one ground station 5 (#1) transmits and receives a control signal through frequency band #1 of satellite communication channel 3, and another ground station 5 (#2) transmits and receives a control signal through frequency band #2 of satellite communication channel 3.

Figure 3:
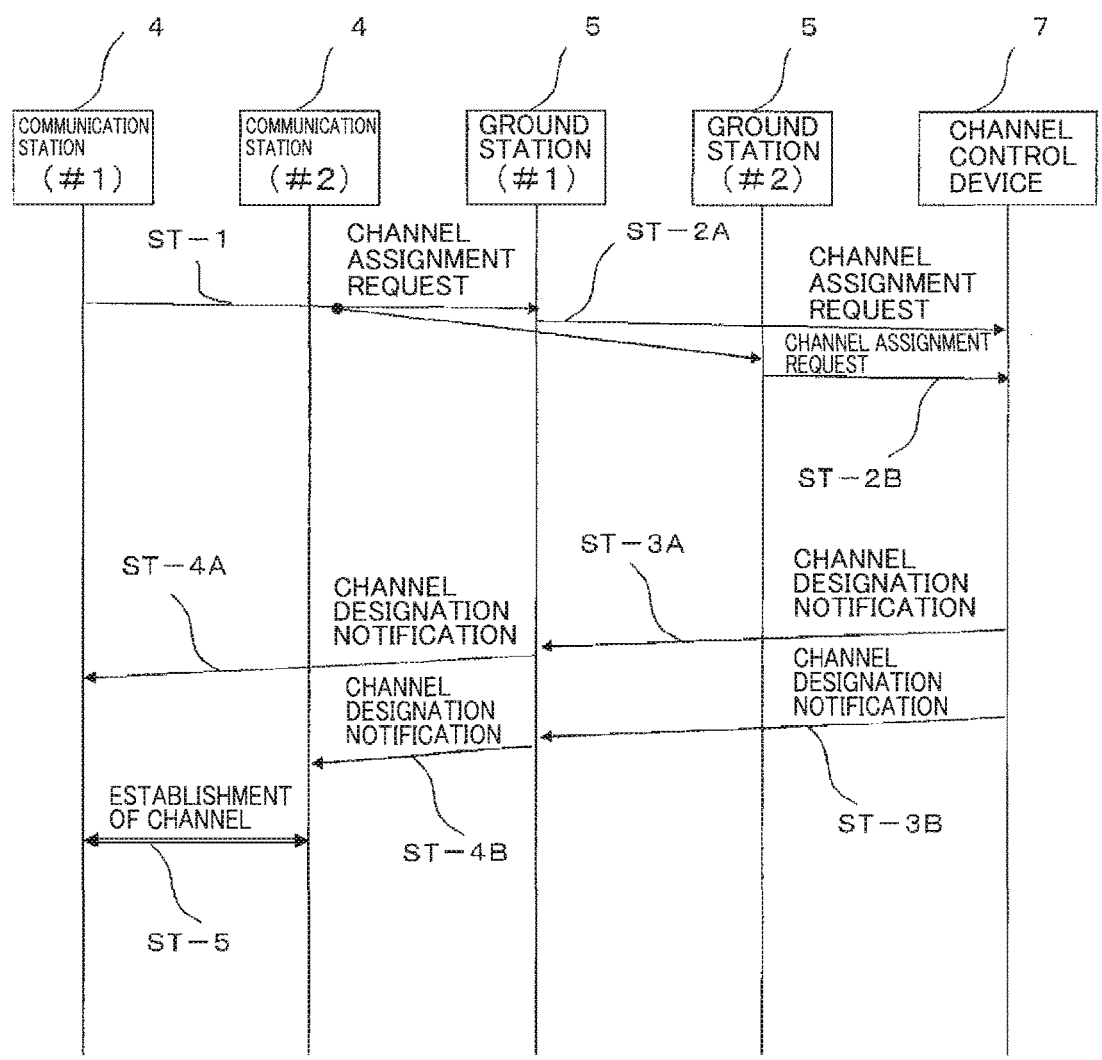
FIG. 3 is a sequence diagram for satellite communication channel connection in the satellite communication system according to the first embodiment of the present disclosure.

The following describes operations. FIG. 3 is a sequence diagram for satellite communication channel connection in the satellite communication system according to the first embodiment of the present disclosure. FIG. 3 shows an exemplary procedure for connection of satellite communication channel 2 to achieve communication between communication station 4 (#1) and counterpart communication station 4 (#2) with which communication station 4 (#1) is to communicate in the configuration of FIG. 1. Communication station 4 (#1) and communication station 4 (#2) communicate with ground station 5 (#1) and ground station 5 (#2) through satellite control channel 3, transmit a signal necessary for channel control such as a channel request, and receive a control signal necessary for channel control through satellite control channel 3. In FIG. 2, for example, this corresponds to a case where both communication station 4 (#1) and communication station 4 (#2) use #1 of satellite control channel 3 or to another case where communication station 4 (#1) and communication station 4 (#2) use respective different ones of satellite control channel 3 such as #1 and #2 of satellite control channel 3 and both ground station 5 (#1) and ground station 5 (#2) transmit and receive control signals through (#1) and (#2) of satellite control channel 3.

In order to perform communication between communication station 4 (#1) and communication station 4 (#2) through satellite communication channel 2, communication station 4 (#1) transmits, through satellite control channel 3 employed for communication with ground station 5 (#1) and ground station 5 (#2), a channel assignment request to request satellite communication channel 2 for communication with communication station 4 (#2) (ST-1). Meanwhile, the channel assignment request is delivered to channel control device 7 via each of the plurality of ground stations 5 as described below. In other words, when one channel assignment request is transmitted from a communication station 4, a plurality of the channel assignment requests are received by channel control device 7. In order to indicate which ones of a plurality of channel assignment requests received by channel control device 7 are identical, each of the channel assignment requests includes identification information unique to the channel assignment request generated by communication station 4. The identification information is unique information among those of respective channel assignment requests generated by communication stations 4. Examples of the identification information include: the address of the terminal of communication station 4; and a combination of pieces of information such as a random number and time.

Each of ground station 5 (#1) and ground station 5 (#2) receives a channel assignment request through satellite control channel 3 and transmits the received channel assignment request to channel control device 7 via ground network 6 (ST-2A, ST-2B). Channel control device 7 determines that a plurality of the channel assignment requests received from ground station 5 (#1) and ground station 5 (#2) and originated from the same communication station 4 (#1) are identical channel assignment requests. Channel control device 7 assigns satellite communication channel 2 once for a collected set of the channel assignment requests determined to be identical. In order to notify the assigned satellite communication channel 2 to communication station 4 (#1) and counterpart communication station 4 (#2), channel control device 7 transmits channel designation notifications via ground network 6 to ground station 5 connected to communication station 4 (#1) and communication station 4 (#2) (FIG. 3 shows an example in which ground station 5 (#1) is selected) (ST-3A, ST-3B).

Ground station 5 (#1) receives the channel designation notification addressed to communication station 4 (#1) and the channel designation notification addressed to counterpart communication station 4 (#2) and transmits the respective channel designation notifications to communication station 4 (#1) and communication station 4 (#2) through the satellite control channel (ST-4A, ST-4B). Communication station 4 (#1) and communication station 4 (#2) receive the channel designation notifications and then establish a communication channel through satellite communication channel 2 designated by the channel designation notifications (ST-5).

FIG. 4 is a sequence diagram for satellite communication channel connection for communication station 4 in the satellite communication system according to the first embodiment of the present disclosure. FIG. 4 (a) shows an operation in communication station 4 when performing the process (ST-1) of transmitting a channel assignment request in FIG. 3. FIG. 4 (b) shows an operation in communication station 4 when receiving a channel designation notification in FIG. 3 (ST-4A, ST-4B). In FIG. 4 (a), in communication station 4, assignment request generator 42 generates a channel assignment request to request assignment of satellite communication channel 2 for communication with a counterpart communication station (communication station 4 (#2) in the case of communication station 4 (#1)) (ST-101). Control communicator 41 transmits the channel assignment request generated by assignment request generator 42 to each of ground station 5 (#1) and ground station 5 (#2) through satellite control channel 3 (ST-1).

In FIG. 4 (b), in communication station 4 (#1), control communicator 41 receives a channel designation notification transmitted from ground station 5 (ST-4A), and indicates, to satellite channel communicator 43, satellite communication channel 2 designated by the channel designation notification (ST-103). Meanwhile, the channel designation notification is also transmitted from ground station 5 to communication station 4 (#2) (ST-4B) so as to designate assigned satellite communication channel 2. Satellite channel communicator 43 communicates with communication station 4 (#2) through satellite communication channel 2 indicated by control communicator 41. In this way, satellite channel communicator 43 establishes a communication channel in FIG. 3 (ST-5).

FIG. 5 is a sequence diagram for satellite communication channel connection for ground station 5 in the satellite communication system according to the first embodiment of the present disclosure. FIG. 5 (a) shows an operation in ground station 5 when ground station 5 transmits a channel assignment request to channel control device 7 in FIG. 3 (ST-2A). Also, the operation in ground station 5 when ground station 5 transmits a channel assignment request to channel control device 7 in ST-2B of FIG. 3 is completely the same as that in FIG. 5 (a). FIG. 5 (b) shows an operation in ground station 5 when ground station 5 transmits a channel designation notification request to communication station 4 in FIG. 3 (ST-4A). Also, the operation in ground station 5 when transmitting a channel designation notification to communication station 4 in ST-4A of FIG. 3 is completely the same as that in FIG. 5 (b).

In FIG. 5 (a), in ground station 5, satellite-related communicator 52 receives a channel assignment request serving as a control signal transmitted by communication station 4 through the satellite control channel (ST-1), and sends it to the relay (ST-111). Relay 53 converts the channel assignment request serving as the control signal received by satellite-related communicator 52 into a message for the ground network, and send it to ground-related communicator 51 with the message being addressed to channel control device 7 (ST-112). Ground-related communicator 51 adds, to the channel assignment request obtained from relay 53, time (ground station reception time) at which this channel assignment request is received by satellite-related communicator 52, and transmits it to channel control device 7 via ground network 6 (ST-2A). The channel assignment request thus transmitted by ground-related communicator 51 is the channel assignment request transmitted by ground station 5 in ST-2A of FIG. 3. It should be noted that the ground station reception time is employed such that channel control device 7, which receives channel assignment requests from a plurality of ground stations 5, determines which ones of the received channel assignment requests are identical. The ground station reception time may be added to the channel assignment request by any one of satellite-related communicator 52, relay 53, and ground-related communicator 51.

In FIG. 5 (b), in ground station 5, ground-related communicator 51 receives the channel designation notification from channel control device 7 via ground network 6 (ST-3A), and sends it to relay 53 (ST-114). Relay 53 converts the channel designation notification received by ground-related communicator 51 into a control signal for satellite control channel 3, and sends it to satellite-related communicator 52 (ST-115). Satellite-related communicator 52 transmits the channel designation notification obtained from relay 53, to communication station 4 through satellite control channel 3 (ST-4A).

Figure 6:
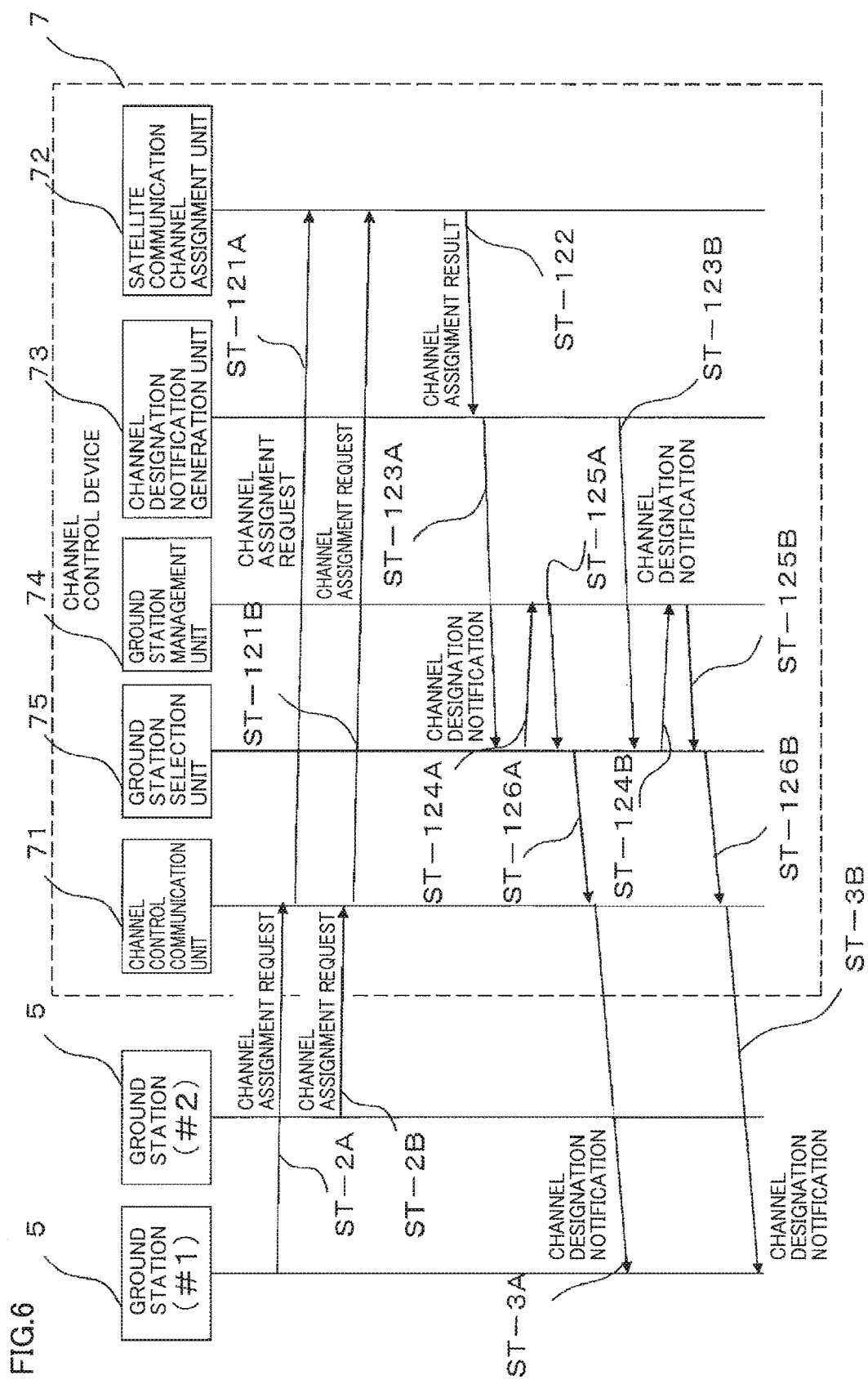
FIG. 6 is a sequence diagram for satellite communication channel connection for a channel control device in the satellite communication system according to the first embodiment of the present disclosure.

FIG. 6 is a sequence diagram for satellite communication channel connection for channel control device 7 in the satellite communication system according to the first embodiment of the present disclosure. FIG. 6 shows an operation in channel control device 7 when transmitting channel designation notifications to ground station 5 in the procedure shown in FIG. 3 (ST-3A, ST-3B). In FIG. 6, ground station 5 (#1) and ground station 5 (#2) transmit, via ground network 6, channel assignment requests received through satellite control channel 3, and channel control communicator 71 receives them in channel control device 7 (ST-2A, ST-2B). Channel control communicator 71 sends the received channel assignment requests to satellite communication channel assignor 72 (ST-121A, ST-121B). When satellite communication channel assignor 72 receives a plurality of identical channel assignment requests from channel control communicator 71 in ST-121A and ST-121B, satellite communication channel assignor 72 determines that the channel assignment requests originated from the same communication station 4 (#1) are identical channel assignment requests, based on the following facts: pieces of identification information included in the channel assignment requests and added by communication station 4 are identical; and a difference between ground station reception times included in the channel assignment requests and added by ground stations 5 falls within a range of a predetermined certain period of time. Satellite communication channel assignor 72 assigns, to the set of channel assignment requests determined to be identical, one of the frequency bands represented by #1 to #m in satellite communication channel 2 in FIG. 2. Satellite communication channel assignor 72 sends, to channel designation notification generator 73, respective pieces of information of assigned satellite communication channel 2, communication station 4 (#1) having transmitted the channel assignment request, and counterpart communication station 4 (#2) (ST-122).

It should be noted that as described above, satellite communication channel assignor 72 has means for determining that a plurality of received channel assignment requests originated from the same communication station are identical channel assignment requests. One example of such means is a method of comparing times at which the channel assignment requests are received through satellite control channel 3 and which are added when ground stations 5 transmits the channel control assignment requests to channel control device 7 via ground network 6. This means employs such a principle that one channel assignment request transmitted by a communication station 4 through satellite control channel 3 is received simultaneously by a plurality of ground stations 5. Satellite communication channel assignor 72 records received channel assignment requests for a predetermined period of time, and determines that the channel assignment requests received during the predetermined period of time are identical channel assignment requests when the channel assignment requests are originated from the same communication station 4, are made to request communication with the same counterpart communication station 4, and pieces of time information added by ground stations 5 falls within a certain range. Another example of the means is as follows: when transmitting a control signal such as a channel assignment request, communication station 4 adds unique identification information to the control signal, and satellite communication channel assignor 72 checks the added identification information to determine that a control signal having identical identification information stored therein is an identical control signal. These means may be applied in combination or one of these means may be applied.

When channel designation notification generator 73 obtains respective pieces of information of (i) satellite communication channel 2 assigned by satellite communication channel assignor 72 and (ii) communication stations 4 (communication station 4 (#1) and communication station 4 (#2)) to which assigned satellite communication channel 2 is notified, channel designation notification generator 73 generates channel designation notifications addressed to communication station 4 (#1) and communication station 4 (#2) (ST-123A, ST-123B). Each channel designation notification includes respective pieces of information of assigned satellite communication channel 2, communication station 4 (#1), and counterpart communication station 4 (#2).

For each of communication stations 4 to which the channel designation notifications are notified, ground station selector 75 makes an inquiry to ground station manager 74 as to a ground station 5 to be connected to communication station 4 through satellite control channel 3 (ST-124A, ST-124B), and obtains that ground station 5 (ST-125A, ST-125B). If one ground station 5 is obtained, ground station selector 75 determines that the channel designation notifications are to be transmitted to the obtained ground station 5. If a plurality of ground stations 5 are obtained, ground station selector 75 selects one therefrom and determines that the channel designation notifications are to be transmitted to the selected ground station 5. Then, ground station selector 75 instructs channel control communicator 71 to transmit the channel designation notifications from channel control communicator 71 to the selected ground station 5 (ST-126A, ST-126B). Channel control communicator 71 transmits the channel designation notifications via ground network 6 to ground station 5 selected by ground station selector 75 (ST-3A, ST-3B). The channel designation notifications thus transmitted by channel control communicator 71 are the channel designation notifications transmitted by channel control device 7 in ST-3A, ST-3B of FIG. 3.

Figure 7:
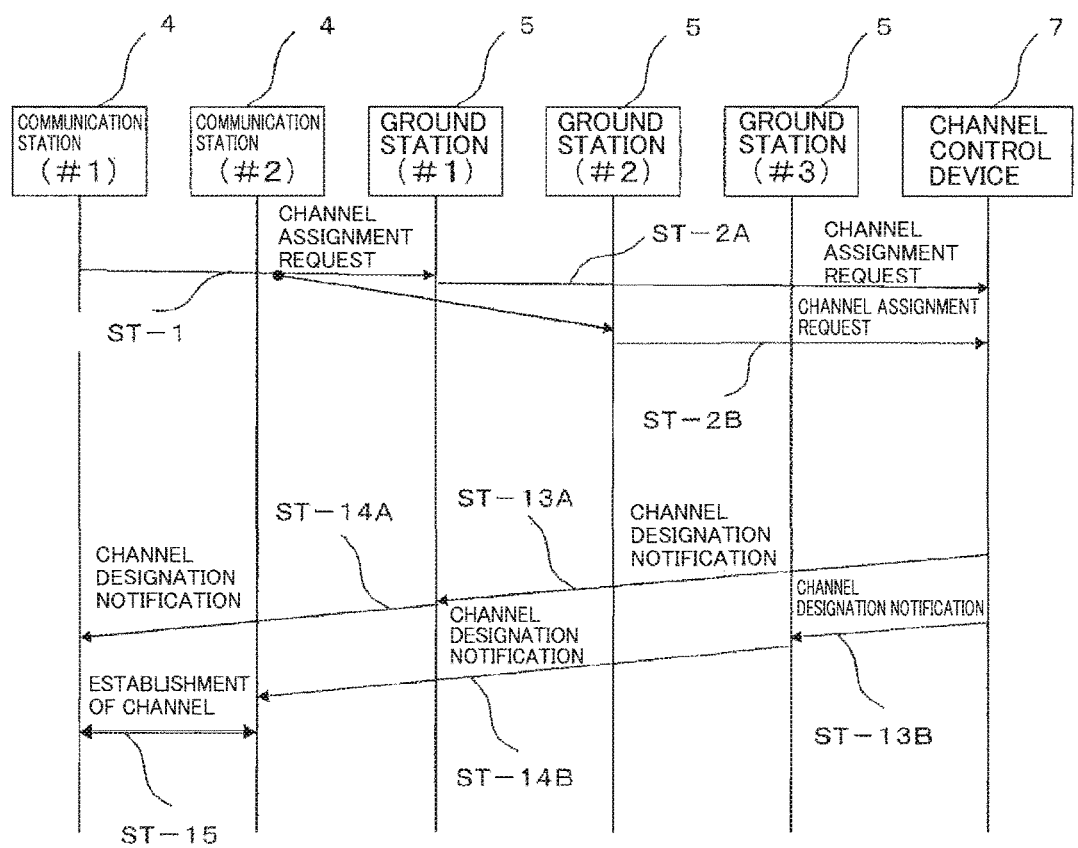
FIG. 7 is another exemplary sequence diagram for satellite communication channel connection in the satellite communication system according to the first embodiment of the present disclosure.

FIG. 7 is a sequence diagram for satellite communication channel connection in the satellite communication system according to the first embodiment of the present disclosure. FIG. 7 shows another exemplary procedure of connection of satellite communication channel 2 for communication between communication station 4 (#1) and communication station 4 (#2) in the configuration of FIG. 1. This corresponds to a case where communication station 4 (#1) and communication station 4 (#2) use respective different frequency bands in #1 to #n of satellite control channel 3. With the different frequency bands, only ground station 5 (#1) and ground station 5 (#2) can communicate with communication station 4 (#1) through satellite control channel 3, and only ground station 5 (#3) can communicate with communication station 4 (#2) through satellite control channel 3.

Communication station 4 (#1) uses a satellite control channel 3 (#1) to communicate with ground station 5 (#1)

and ground station 5 (#2), transmits a signal necessary for channel control such as a channel request, and receives a signal necessary for channel control through satellite control channel 3. Communication station 4 (#2) uses a satellite control channel 3 (#2) to communicate with ground station 5 (#3), transmits a signal necessary for channel control such as a channel request, and receives a signal necessary for channel control through satellite control channel 3.

The transmission of channel assignment request from communication station 4 in FIG. 7 (ST-1) and the transfer of channel assignment requests to channel control device 7 by ground stations 5 (ST-2A, ST-2B) are the same as those in FIG. 3. Channel control device 7 determines that a plurality of channel assignment requests originated from the same communication station 4 (#1) and transmitted from ground station 5 (#1) and ground station 5 (#2) are identical channel assignment requests, and assigns satellite communication channel 2 in response to the channel requests. In order to notify assigned satellite communication channel 2 to communication station 4 (#1) and communication station 4 (#2), channel control device 7 transmits channel designation notifications via ground network 6 to ground stations 5 connected to communication station 4 (#1) and communication station 4 (#2) (FIG. 7 illustrates an example in which ground station 5 (#1) and ground station 5 (#3) are selected) (ST-13, ST-13B).

Ground station 5 (#1) and ground station 5 (#3) receive the channel designation notifications addressed to communication station 4 (#1) and communication station 4 (#2), and transmit the received channel designation notifications to communication station 4 (#1) and communication station 4 (#2) through satellite control channel 3 (ST-14A, ST-14B). Communication station 4 (#1) and communication station 4 (#2) establish a communication channel through satellite communication channel 2 designated by the channel designation notifications received through satellite control channel 3 (ST-15). It should be noted that respective operations in communication station 4 in connection with the transmission of channel assignment request from communication station 4 (ST-1) and the establishment of communication channel (ST-15) are the same as those in FIG. 4 (*a*) and FIG. 4 (*b*). Respective operations in ground station 5 in connection with the transfer of channel assignment request to channel control device 7 (ST-2A (ST-2B)) and the transfer of channel designation notification to communication station 4 (ST-14A (ST-14B)) are the same as those in FIG. 5 (*a*) and FIG. 5 (*b*). An operation in channel control device 7 in connection with the transmission of channel designation notification (ST-13A (ST-13B)) is the same as that in FIG. 6.

As described above, according to the first embodiment of the present disclosure, one or more ground stations 5, each of which is configured to transmit/receive a control signal to/from communication station 4 through satellite control channel 3, are connected to one communication station 4, thereby providing redundancy in transmitting/receiving control signals through satellite control channel 3. Even if a local disaster or the like occurs, this redundancy enables communication to be continued unless all the ground stations 5 connected to communication stations 4 become unusable.

Moreover, each of ground stations 5 does not need to be capable of transmitting and receiving control signals through all the channels of satellite control channel 3 as long as each of ground stations 5 is capable of transmitting and receiving control signals in one or more channels of satellite control channel 3. Hence, a large-scale transmission/reception facility does not need to be constructed. This facilitates providing redundancy to ground stations 5 by providing a spare ground station 5, and facilitates installing substitutive ground stations 5 in case that a problem occurs in a part of ground stations 5. Also, channel control device 7 can be constructed on ground network 6 by using a general-purpose computer or the like. Hence, redundancy can be readily achieved by providing a spare channel control device 7 on ground network 6 or by constructing channel control device 7 using a plurality of computers on ground network 6. Accordingly, the satellite communication system and channel control device 7 can be obtained with which service can be continued even in the event of a disaster.

Further, since the plurality of ground stations 5 are provided, channel control device 7 receives channel assignment requests identical to that originated from communication station 4. However, it is possible to determine whether or not received channel assignment requests are identical by (i) configuring communication station 4 to provide identification information in its channel assignment request, (ii) configuring ground station 5 to add ground station reception time to the channel assignment request, and (iii) configuring channel control device 7 to check the identification information and ground station reception time included in the received channel assignment request.

Figure 8:
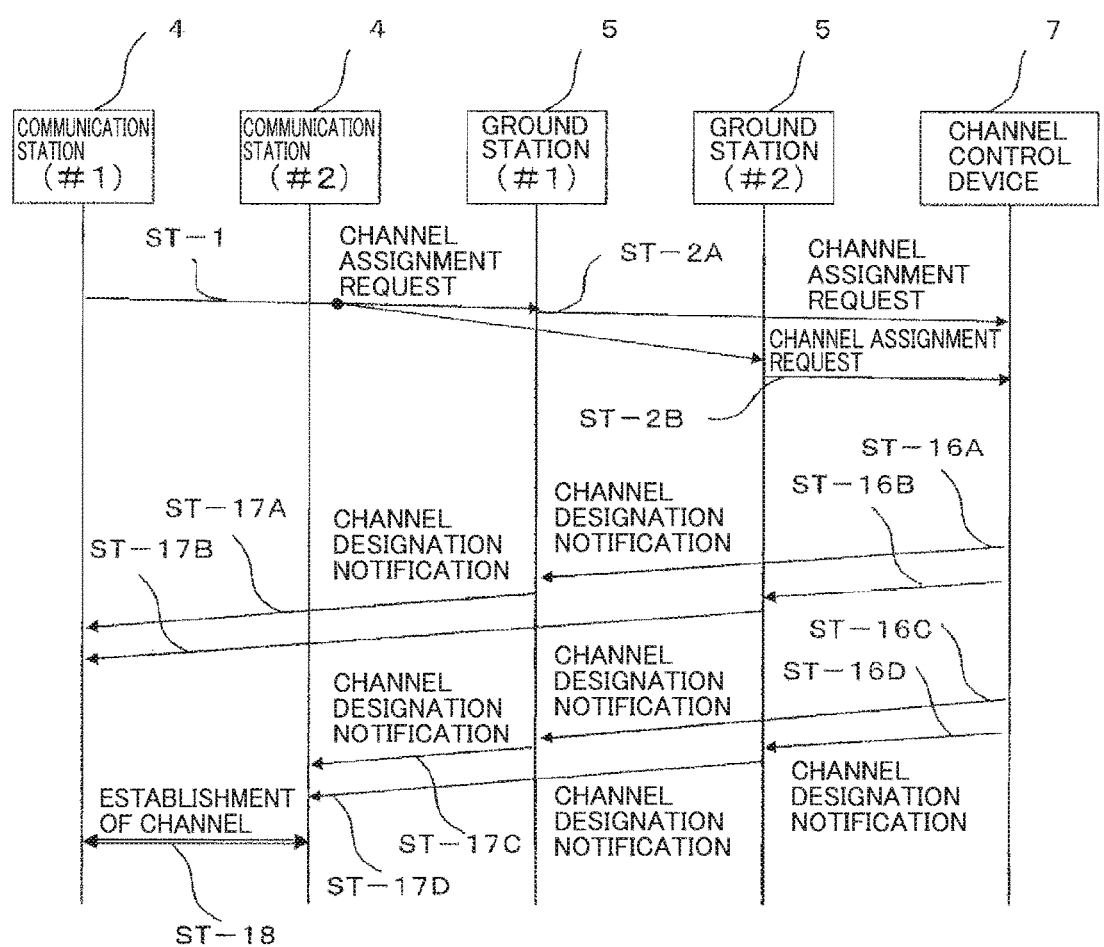
FIG. 8 is a sequence diagram for satellite communication channel connection in another exemplary satellite communication system according to the first embodiment of the present disclosure.

It should be noted that in the above example, channel control device 7 transmits a channel designation notification to each communication station 4 via one ground station 5; however, channel designation notifications may be transmitted to one communication station 4 via a plurality of ground stations 5. FIG. 8 is a sequence diagram for satellite communication channel connection in the satellite communication system according to the first embodiment of the present disclosure. FIG. 8 shows an example in which channel designation notifications are transmitted from channel control device 7 to one communication station 4 via a plurality of ground stations 5 in the procedure of connection of satellite communication channel 2 for communication between communication station 4 (#1) and communication station 4 (#2) in the configuration of FIG. 1. Communication station 4 (#1) uses satellite control channel 3 (#1) to communicate with ground station 5 (#1) and ground station 5 (#2), transmits a signal necessary for channel control such as a channel request, and receives a signal necessary for channel control through satellite control channel 3. Communication station 4 (#2) uses satellite control channel 3 (#2) to communicate with ground station 5 (#1) and ground station 5 (#2), transmits a signal necessary for channel control such as a channel request, and receives a signal necessary for channel control through satellite control channel 3.

The transmission of channel assignment request from communication station 4 in FIG. 8 (ST-1) and the transfer of channel assignment requests to channel control device 7 by ground stations 5 (ST-2A, ST-2B) are the same as those in FIG. 3. Channel control device 7 determines that the plurality of channel assignment requests transmitted from ground station 5 (#1) and ground station 5 (#2) are identical channel assignment requests, and assigns satellite communication channel 2 in response to the channel requests. In order to notify assigned satellite communication channel 2 to communication station 4 (#1) and communication station 4 (#2), channel control device 7 transmits channel designation notifications via ground network 6 to the plurality of ground stations 5 connected to communication station 4 (#1) (ground station 5 (#1) and ground station 5 (#2) in FIG. 8) and a plurality of ground stations 5 connected to communication station 4 (#2) (ground station 5 (#1) and ground station 5 (#2) in FIG. 8) (ST-16A, ST-16B, ST-16C, ST-16D).

Ground station 5 (#1) receives the channel designation notifications addressed to communication station 4 (#1) and addressed to counterpart communication station 4 (#2), and transmits the channel designation notifications to communication station 4 (#1) and communication station 4 (#2) through the satellite control channel (ST-17A, ST-17C). Ground station 5 (#2) receives the channel designation notifications addressed to communication station 4 (#1) and addressed to counterpart communication station 4 (#2), and transmits the channel designation notifications to communication station 4 (#1) and communication station 4 (#2) through the satellite control channel (ST-17B, ST-17D). Communication station 4 (#1) and communication station 4 (#2) receive the channel designation notifications and establish a communication channel through satellite communication channel 2 designated by the channel designation notifications (ST-18).

Figure 9:
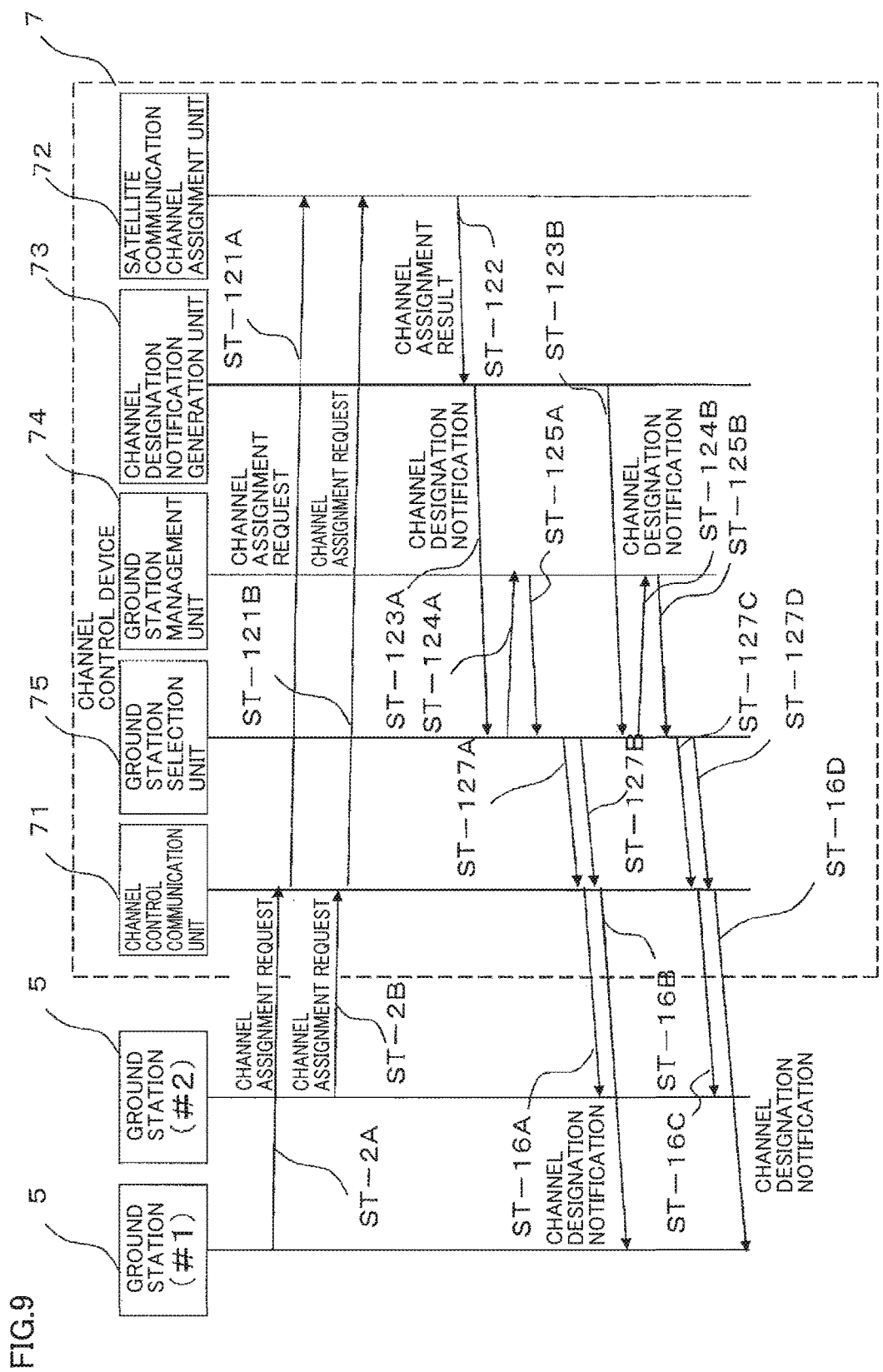
FIG. 9 is a sequence diagram for satellite communication channel connection for the channel control device in accordance with a second method for satellite communication channel connection in the satellite communication system according to the first embodiment of the present disclosure.

FIG. 9 is a sequence diagram for satellite communication channel connection for channel control device 7 in the satellite communication system according to the first embodiment of the present disclosure. FIG. 9 shows an operation of channel control device 7 in an example in which channel designation notifications are transmitted from channel control device 7 to one communication station 4 via a plurality of ground stations 5. A procedure until satellite communication channel assignor 72 assigns satellite communication channel 2 based on a channel assignment request from a ground station 4 and channel designation notification generator 73 generates channel designation notifications (ST-2A, ST-2B, ST-121A, ST-121B, ST-122A, ST-122B, ST-123A, ST-123B) will not be described because the procedure is completely the same as that in the above-described case where a channel designation notification is transmitted to communication station 4 via one ground station 5, except that an operation of satellite-related communicator 52 transmitting a channel designation notification to communication station 4 is represented by ST-17A in FIG. 5 (b).

For each of communication stations 4 to which the channel designation notifications are notified, ground station selector 75 makes an inquiry to ground station manager 74 as to a ground station 5 to be connected to communication station 4 through satellite control channel 3 (ST-124A, ST-124B), and obtains one or more corresponding ground stations 5 (ST-125A, ST-125B). Ground station selector 75 determines that the channel designation notifications are addressed to the obtained ground station(s) 5, and instructs channel control communicator 71 to transmit the channel designation notifications to these ground station(s) 5 (ST-127A to D). FIG. 9 shows a case where both ground station 5 (#1) and ground station 5 (#2) are selected as transmission destinations of the channel designation notifications for each communication station 4. Channel control communicator 71 transmits the channel designation notifications via ground network 6 to ground stations 5 (#1 and #2) selected by ground station selector 75 (ST-16A to ST-16D). Respective operations of ground stations 5 having received the channel designation notifications from channel control device 7 (ST-16A to ST-16D) will not be described because the operations are completely the same as respective operations obtained by replacing ST-3A with ST-16A to ST-16D and ST-4A with ST-17A to ST-17D in FIG. 5 (b).

Figure 10:
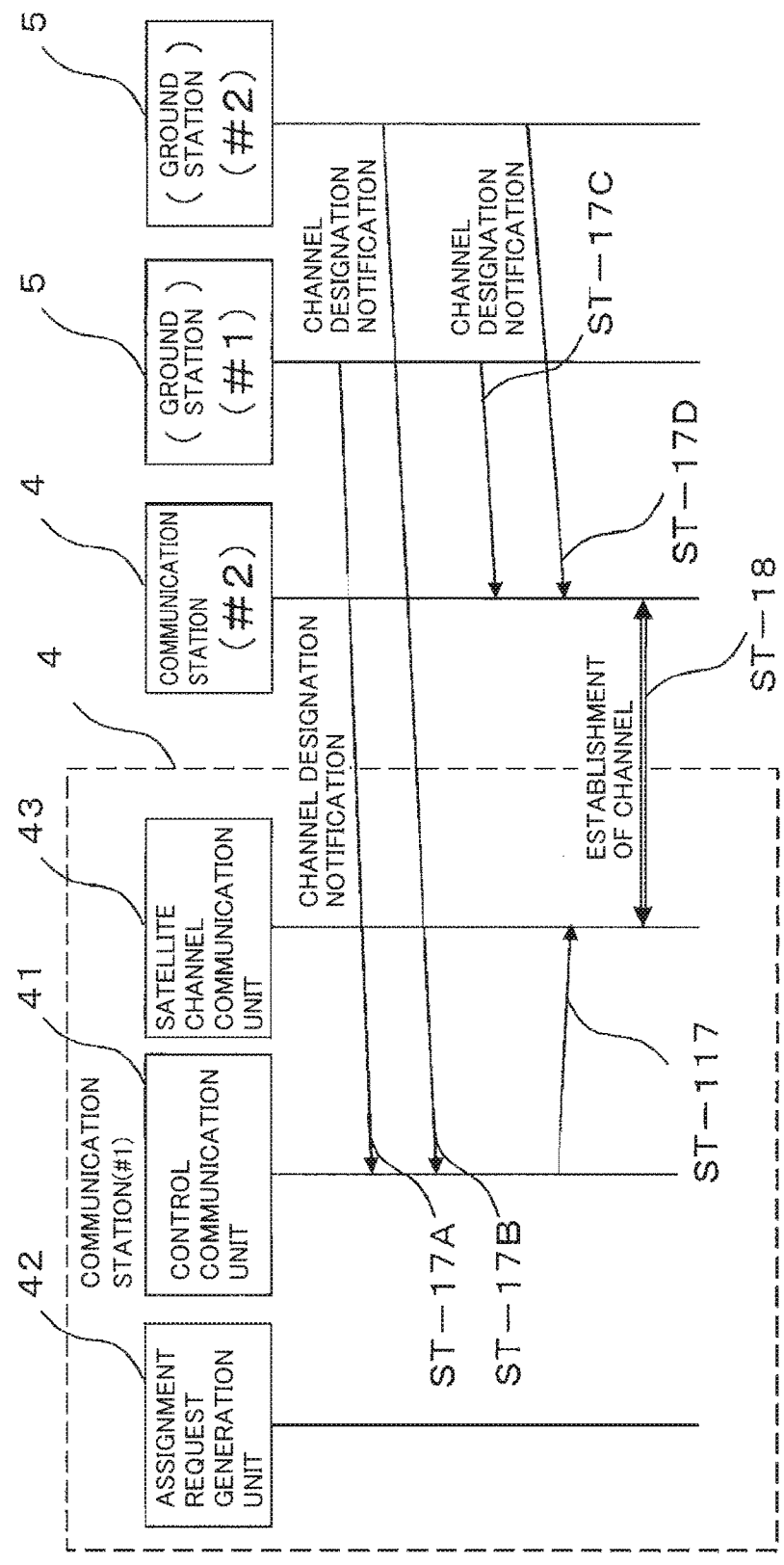
FIG. 10 is a sequence diagram for satellite communication channel connection for a communication station in accordance with a second method for satellite communication channel connection in the satellite communication system according to the first embodiment of the present disclosure.

FIG. 10 is a sequence diagram for satellite communication channel connection for communication station 4 in the satellite communication system according to the first embodiment of the present disclosure. FIG. 10 shows an operation in communication station 4 for receiving channel designation notifications (ST-17A to ST-17D) and establishing a channel (ST-18). In FIG. 10, in communication station 4 (#1), control communicator 41 receives channel designation notifications from ground station 5 (#1) and ground station 5 (#2) in ST-17A, ST-17B, checks pieces of information about counterpart communication station 4 (#2) as included in the received channel designation notifications, and determines that channel designation notifications including the information about the same communication station 4 (#2) are identical. Control communicator 41 indicates, to satellite channel communicator 43, satellite communication channel 2 designated by a collected set of the channel designation notifications determined to be identical (ST-117).

Satellite channel communicator 43 communicates with communication station 4 (#2) through satellite communication channel 2 indicated by control communicator 41 (ST-18). Likewise, communication station 4 (#2) receives channel designation notifications transmitted from ground station 5 (#1) and ground station 5 (#2) in ST-17C, ST-17D, and communicates with communication station 4 (#1) through satellite communication channel 2 designated by the channel designation notifications.

As such, the satellite communication channel can be correctly connected also in the case where channel control device 7 transmits channel designation notifications to a communication station 4 via a plurality of ground stations 5. Moreover, although communication station 4 receives identical channel designation notifications via the plurality of ground stations 5, whether or not the received channel designation notifications are identical can be determined by checking pieces of information about the counterpart communication station as included in the channel designation notifications as described above. It should be noted that in order for communication station 4 to more securely determine whether or not the channel designation notifications are identical, channel designation notification generator 73 of channel control device 7 may be configured to add respective pieces of unique identification information to generated channel designation notifications when generating the channel designation notifications (ST-123A, ST-123B in FIG. 9), and control communicator 41 of communication station 4 may be configured to check the respective pieces of identification information added to the channel designation notifications so as to determine whether or not they are identical when control communicator 41 of communication station 4 indicates satellite communication channel 2 to satellite channel communicator 43 (ST-117 in FIG. 10). Alternatively, satellite-related communicator 52 of ground station 5 may be configured to add ground station communicator reception times, which represent times at which ground related communicator 51 receives the channel designation notifications from channel control device 7, to the channel designation notifications when transmitting the channel designation notifications to communication station 4 (ST-17A to ST-17D in FIG. 8), and control communicator 41 of communication station 4 may be configured to determine, when indicating satellite communication channel 2 to satellite channel communicator 43 (ST-117 in FIG. 10), whether or not they are identical based on such a fact that a difference between the ground station communicator reception times added to the respective channel designation notifications falls within a range of a predetermined period of time.

Second Embodiment

Figure 11:
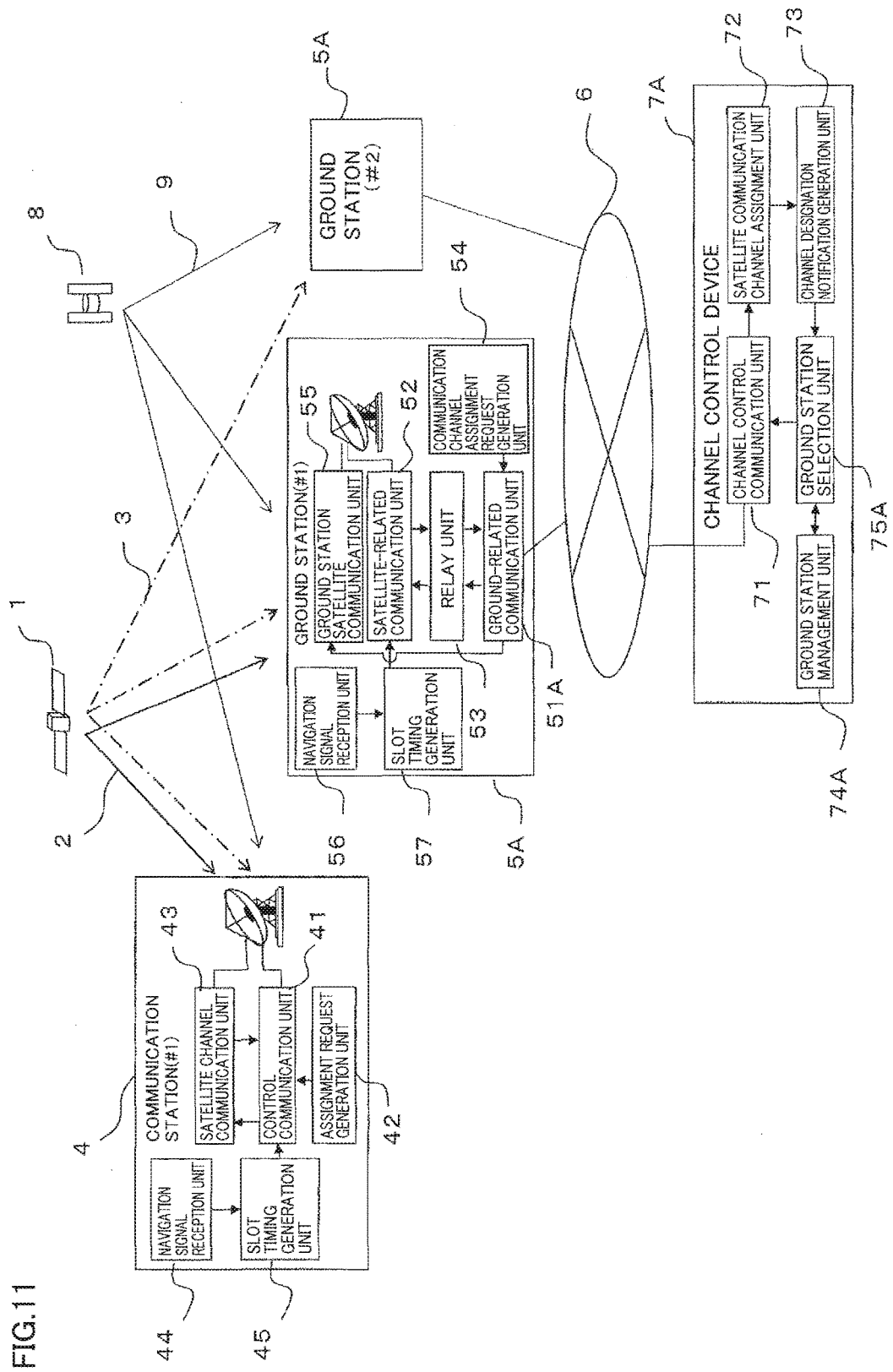
FIG. 11 shows a configuration of a satellite communication system according to a second embodiment of the present disclosure.

FIG. 11 shows a configuration of a satellite communication system according to a second embodiment of the present disclosure. In FIG. 11, the same components are given the same reference characters as those in FIG. 1 and are not described repeatedly. As the ground stations, the satellite communication system according to the second embodiment of the present disclosure includes ground stations 5A each having the function of ground station 5 of the first embodiment as well as a function of transmitting/receiving a control signal to/from channel control device 7 via ground network 6 in relation with assignment of satellite communication channel 2 for communication with a communication station 4 or another ground station 5A and communicating with communication station 4 through satellite communication channel 2. Moreover, in addition to the transmission of channel designation notifications to communication station 4 and counterpart communication station 4 by channel control device 7, channel control device 7A is configured to transmit channel designation notifications to a ground station 5A and a communication station 4 or a ground station 5A and another ground station 5A when ground station 5A communicates with communication station 4 or another ground station 5A through the satellite communication channel.

As with ground station 5 in the first embodiment, each of ground stations 5A includes: a ground-related communicator 51A configured to communicate via ground network 6; a satellite-related communicator 52 configured to communicate through satellite control channel 3; and a relay 53 configured to relay a control signal between ground-related communicator 51 and satellite-related communicator 52A. Moreover, in addition to those described above, ground station 5A includes: a communication channel assignment request generator 54 configured to generate a channel assignment request to be transmitted by ground-related communicator 51A, the channel assignment request being made to request assignment of satellite communication channel 2; and a ground station satellite communicator 55 configured to communicate through satellite communication channel 2 designated by a channel designation notification received by ground-related communicator 51A. In addition to transmission and reception of a control signal for the purpose of relaying it between communication station 4 and channel control device 7A, ground-related communicator 51A is different from ground-related communicator 51 in that ground-related communicator 51A has a function of transmitting and receiving a control signal between ground station 5A and channel control device 7A via ground network 6.

As with channel control device 7, channel control device 7A includes: a channel control communicator 71 configured to communicate via the ground network; a satellite communication channel assignor 72 configured to assign a satellite communication channel in response to a channel assignment request received by channel control communicator 71; and a channel designation notification generator 73 configured to generate a channel designation notification for notifying a result of assignment of satellite communication channel assignor 72 to communication station 4 or ground station 5A. Moreover, ground station manager 74A of channel control device 7A records communication station 4 or ground station 5A which communicates through satellite communication channel 2, in addition to ground stations 5A which communicates with communication stations 4 through satellite control channel 3. Furthermore, ground station selector 75A of channel control device 7A is configured to select a ground station 5A to communicate with a communication station 4 through satellite control channel 3, and select a ground station 5A as a ground station for transmitting a channel designation notification when satellite communication channel 2 for ground station 5A to communicate is assigned.

The satellite communication system according to the second embodiment of the present disclosure as shown in FIG. 11 includes: communication station 4, which is also referred to as an "earth station", configured to communicate through satellite communication channel 2; the plurality of ground stations 5A connected to communication station 4 through satellite control channel 3; and channel control device 7A connected to the plurality of ground stations 5A via ground network 6. As with ground station 5, ground station 5A can transmit and receive a control signal using ground-related communicator 51A, satellite-related communicator 52, and relay 53 through satellite control channel 3 shown in FIG. 2, can be connected to channel control device 7A via ground network 6, and can be connected to a plurality of communication stations 4. It should be noted that FIG. 11 illustrates one communication station 4 and two ground stations 5A; however, the number of communication stations 4 and the number of ground stations 5A may be any numbers and are not limited to those illustrated in FIG. 11.

Each of ground stations 5A connected to ground network 6 transmits/receives control signals to/from one or more communication stations 4 through #1 to #n of satellite control channel 3 in the same manner as that in ground station 5 as shown in FIG. 2, and each of ground stations 5A transmits/receives control signals through one or more control channels #1 to #n of satellite control channel 3 in the same manner as that in ground station 5 as shown in FIG. 2. Further, control signals can be transmitted and received through all the satellite control channels #1 to #n of satellite control channel 3 through which control signals are transmitted and received by the plurality of ground stations 5A connected to channel control device 7 via ground network 6.

Figure 12:
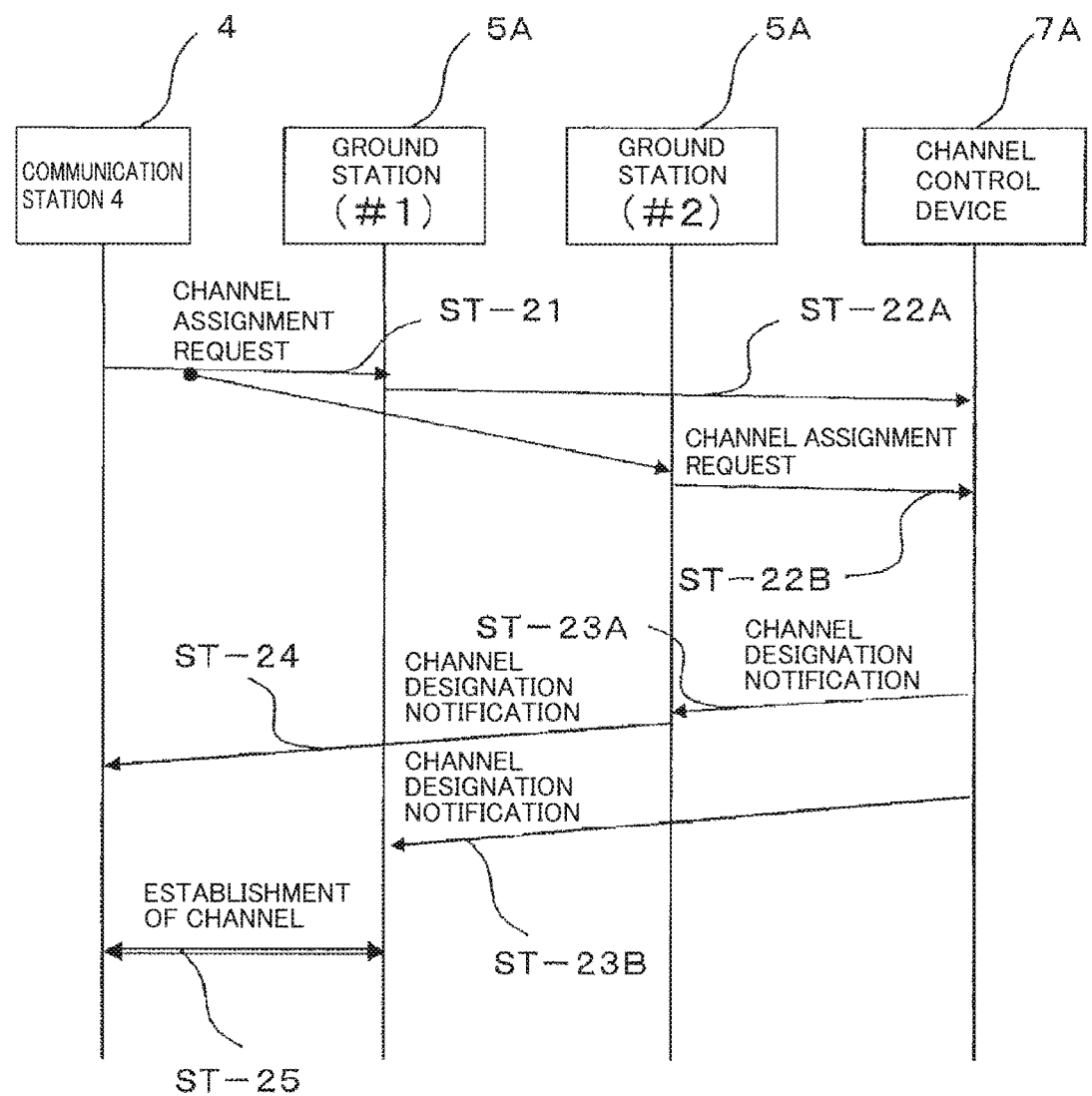
FIG. 12 is a sequence diagram for satellite communication channel connection in the satellite communication system according to the second embodiment of the present disclosure.

FIG. 12 is a sequence diagram for satellite communication channel connection in the satellite communication system according to the second embodiment of the present disclosure. FIG. 12 shows an exemplary procedure of assigning satellite communication channel 2 for communication between ground station 5A and communication station 4 through satellite communication channel 2. As shown in FIG. 11, ground station 5A communicates with communication station 4 by way of a control signal through satellite control channel 3, and communicates with channel control device 7 via ground network 6. Communication station 4 uses satellite control channel 3 to communicate with ground station 5 (#1) and ground station 5 (#2), transmits a signal necessary for channel control such as a channel request, and receives a signal necessary for channel control from ground station 5 (#2) through satellite control channel 3. In FIG. 2, for example, this corresponds to a case where communication station 4 transmits and receives a control signal using #1 of satellite control channel 3, and ground station 5A (#1) and ground station 5A (#2) transmit and receive control signals through (#1) of satellite control channel 3.

For communication between communication station 4 and ground station 5A (#1) through satellite communication channel 2, communication station 4 transmits, through satellite control channel 3 employed for communication with ground station 5A (#1) and ground station 5A (#2), a channel assignment request for communication with ground station 5A (#1) through satellite communication channel 2 (ST-21).

The channel assignment request includes: pieces of information about communication station 4 and counterpart communication station 5A; and identification information indicating which ones of a plurality of channel assignment requests received by channel control device 7A via the plurality of ground stations 5 are identical. The identification information is information unique to each of the channel assignment requests generated by communication station 4. Each of ground station 5A (#1) and ground station 5A (#2) receives a channel assignment request through satellite control channel 3 and transmits the received channel assignment request to channel control device 7A via ground network 6 (ST-22A, ST-22B). Channel control device 7A determines that the plurality of channel assignment requests transmitted from ground station 5A (#1) and ground station 5A (#2) and originated from communication station 4 are identical channel assignment requests, assigns satellite communication channel 2 in response to the channel requests, and transmits channel designation notifications via ground network 6 to (i) ground station 5A (FIG. 12 shows an example in which ground station 5A (#2) is selected to provide the notification to communication station 4) connected to communication station 4 (#1) and (ii) ground station 5A (#1) in order to notify assigned satellite communication channel 2 to communication station 4 and ground station 5A (#1) (ST-23A, ST-23B).

Ground station 5A (#2) receives the channel designation notification addressed to communication station 4, and relays the received channel designation notification to communication station 4. Moreover, ground station 5A (#1) receives the channel designation notification addressed to ground station 5A (#1) (ST-24). Communication station 4 and ground station 5A (#1) establish a communication channel through satellite communication channel 2 designated by the channel designation notifications (ST-25).

Figure 13:
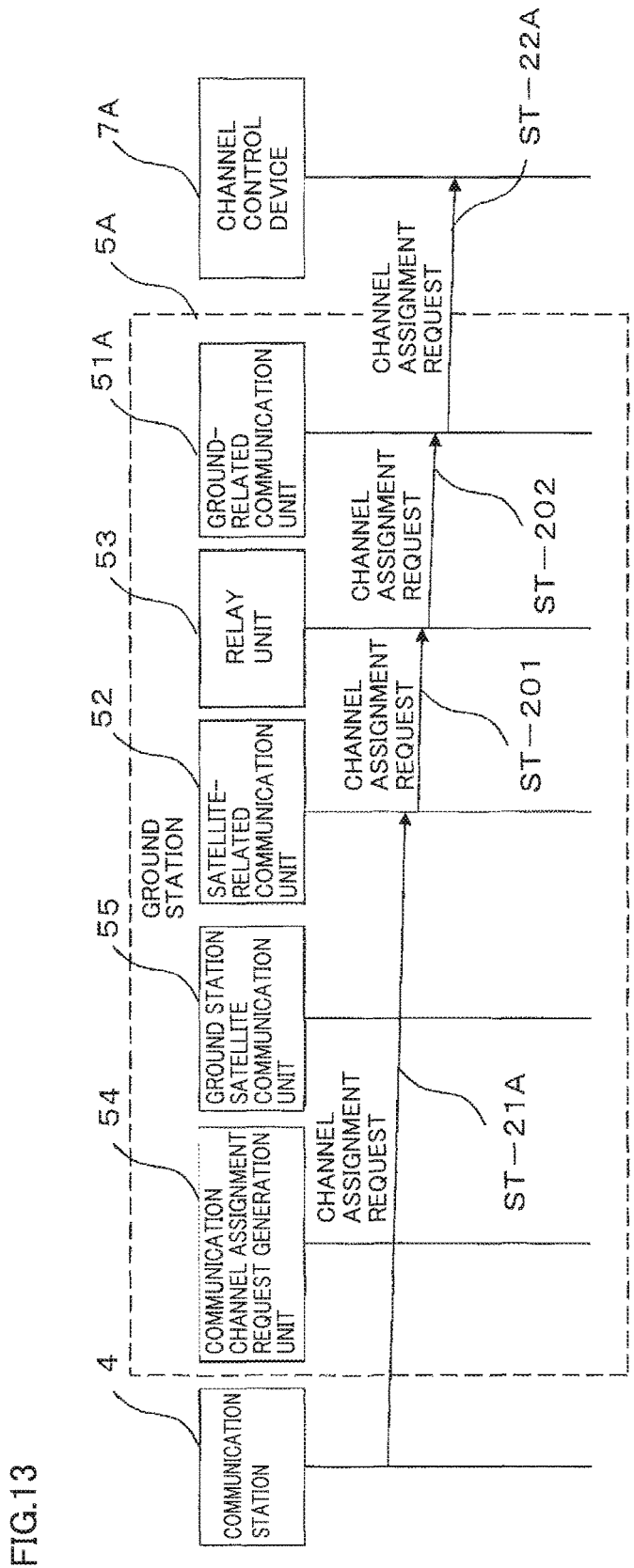
FIG. 13 is a sequence diagram for satellite communication channel connection for a ground station in the satellite communication system according to the second embodiment of the present disclosure.

An operation in communication station 4 when transmitting a channel assignment request from communication station 4 to the ground station in FIG. 12 (ST-21) is the same as that in FIG. 4 (a), and an operation in communication station 4 when establishing a communication channel between communication station 4 and ground station 5A (#1) (ST-25) is the same as that in FIG. 4 (b). FIG. 13 is a sequence diagram for satellite communication channel connection for the ground station in the satellite communication system according to the second embodiment of the present disclosure. FIG. 13 shows an operation in ground station 5A when transmitting a channel assignment request to channel control device 7A (ST-22A) in the procedure shown in FIG. 12. FIG. 13 is directed to ST-22A, but ST-22B is completely the same as that in FIG. 13. In FIG. 13, in ground station 5A, satellite-related communicator 52 receives a channel assignment request serving as a control signal transmitted by communication station 4 through the satellite control channel (ST-21), and transmits it to relay 53 (ST-201). Relay 53 converts the channel assignment request serving as the control signal received by satellite-related communicator 52 into a message for the ground network, and send it to ground-related communicator 51 with the message being addressed to channel control device 7A (ST-202). Ground-related communicator 51A adds, to the channel assignment request obtained from relay 53, time (ground station reception time) at which this channel assignment request is received by satellite-related communicator 52, and transmits it to channel control device 7A via ground network 6 (ST-22A).

FIG. 14 is a sequence diagram for satellite communication channel connection for ground station 5A in the satellite communication system according to the second embodiment of the present disclosure. FIG. 14 (a) shows an operation when ground station 5A receives a channel designation notification addressed to communication station 4 (operation of ground station 5A (#2) in FIG. 12). When ground-related communicator 51A receives a channel designation notification from channel control device 7A (ST-23A) and the received channel designation notification is addressed to communication station 4, ground-related communicator 51A sends the channel designation notification to relay 53 (ST-211). Relay 53 converts the channel designation notification received by ground-related communicator 51 into a control signal for satellite control channel 3, and sends it to satellite-related communicator 52 (ST-212). Satellite-related communicator 52 transmits the channel designation notification obtained from relay 53, to communication station 4 through satellite control channel 3 (ST-24).

FIG. 14 (b) shows an operation when ground station 5A receives a channel designation notification addressed to ground station 5A (operation of ground station 5A (#1) in FIG. 12). When ground-related communicator 51A receives a channel designation notification from channel control device 7A (ST-23B) and the received channel designation notification is addressed to ground station 5A, ground-related communicator 51A sends the channel designation notification to ground station satellite communicator 55 (ST-214). Ground station satellite communicator 55 establishes a communication channel through satellite communication channel 2 designated by the channel designation notification (ST-25).

Figure 15:
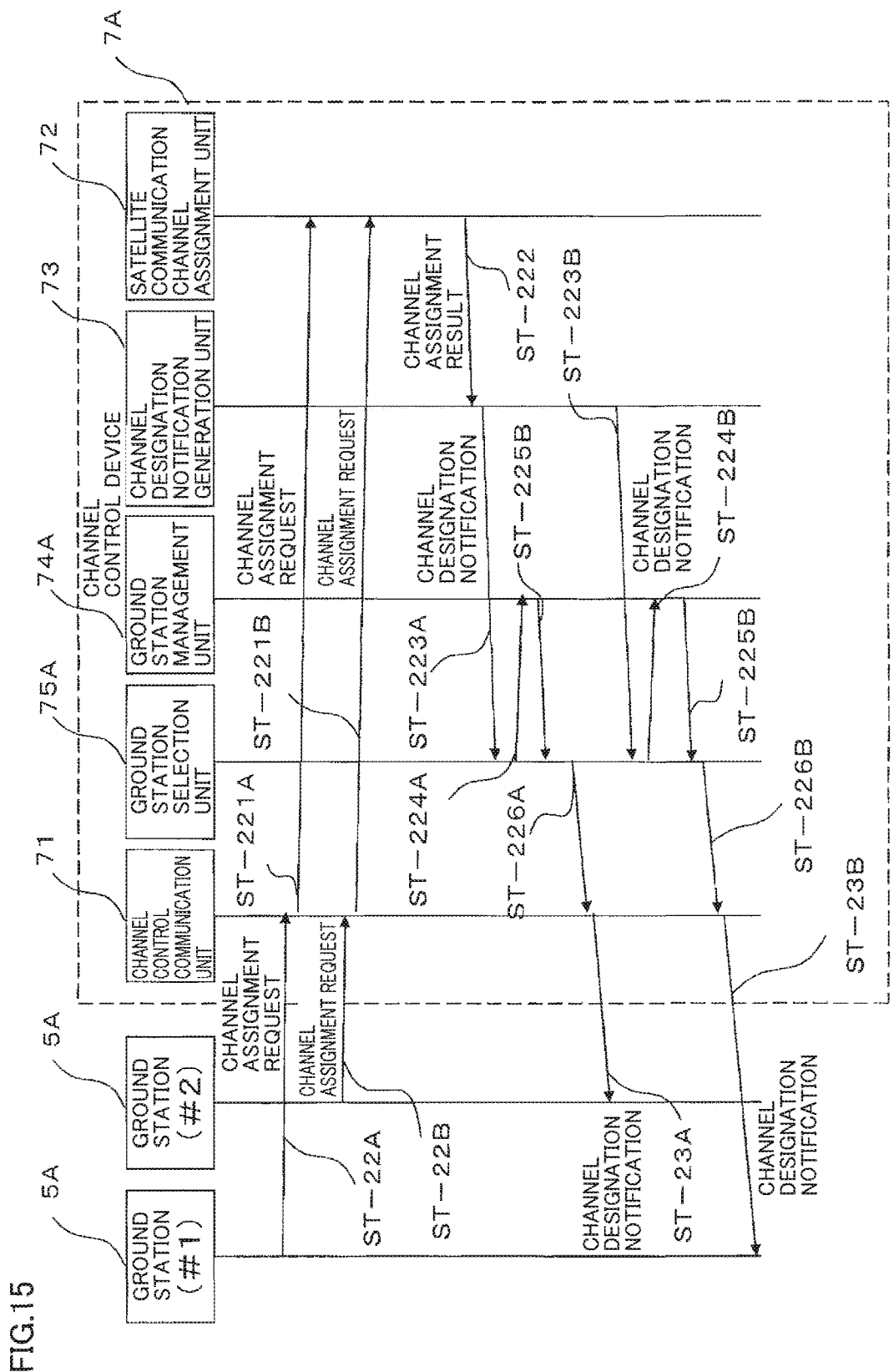
FIG. 15 is a sequence diagram for satellite communication channel connection for a channel control device in the satellite communication system according to the second embodiment of the present disclosure.

FIG. 15 is a sequence diagram for satellite communication channel connection for channel control device 7A in the satellite communication system according to the second embodiment of the present disclosure. FIG. 15 shows an operation of channel control device 7A in the procedure shown in FIG. 12, and shows an operation in channel control device 7A when transmitting channel designation notifications to ground station 5A (#1) and ground station 5A (#2) (ST-23A, ST-23B). In FIG. 15, in channel control device 7A, channel control communicator 71 receives channel assignment requests transmitted via ground network 6 by ground station 5A (#1) and ground station 5A (#2) having received the channel assignment requests (ST-22A, ST-22B), and sends them to satellite communication channel assignor 72 (ST-221A, ST-221B). When satellite communication channel assignor 72 receives a plurality of identical channel assignment requests from channel control communicator 71, satellite communication channel assignor 72 determines that the channel assignment requests originated from the same communication station 4 (#1) are identical channel assignment requests, based on the following facts: pieces of identification information included in the channel assignment requests and added by communication station 4 are identical; and a difference between the ground station reception times included in the channel assignment requests and added by ground stations 5A (#1), 5A (#2) falls within a range of a predetermined certain period of time. Satellite communication channel assignor 72 once assigns satellite communication channel 2 in response to a collected set of the channel assignment requests determined to be identical and notifies, to channel designation notification generator 73, (i) assigned satellite communication channel 2, (ii) communication station 4 having transmitted the channel assignment request, and (iii) ground station 5A (#1) serving as a counterpart communication station (ST-222). Satellite communication channel assignor 72 records received channel assignment requests for a predetermined period of time, and determines that the channel assignment requests received during the predetermined period of time are identical channel assignment requests when the channel assignment requests are originated from the same communication station 4 and request communication with the same counterpart communication station to which communication station 4 is to communicate.

When channel designation notification generator 73 obtains assigned satellite communication channel 2 from satellite communication channel assignor 72, channel designation notification generator 73 generates channel designation notifications addressed to communication station 4 and ground station 5A (#1) serving as the counterpart communication station, in order to notify assigned satellite communication channel 2 to communication station 4 and ground station 5A (#1) (ST-223A, ST-223B).

For communication station 4 to which the channel designation notification is to be transmitted, ground station selector 75A makes an inquiry to ground station manager 74A as to a ground station 5A to be connected to communication station 4 through satellite control channel 3 (ST-224A), and obtains that ground station 5 (ST-225A). When one ground station 5A is obtained, ground station selector 75A determines that the channel designation notification is to be transmitted to the obtained ground station 5A, whereas when a plurality of ground stations 5A are obtained, ground station selector 75A selects one therefrom and determines that the channel designation notification is to be transmitted to the selected ground station 5A (ST-226A). Moreover, ground station selector 75A makes an inquiry to ground station manager 74A as to ground station 5A (#1) to which the channel designation notification is to be transmitted (ST-224B), and obtains, from ground station manager 74A, a reply indicating that ground station 5A (#1) is ground station 5A with which communication is to be made through satellite communication channel 2 (ST-225B). For ground station 5A (#1) with which communication is to be made through satellite communication channel 2, ground station selector 75A determines ground station 5A (#1) as a transmission destination (ST-226B). Ground station selector 75A instructs channel control communicator 71 to transmit the channel designation notifications to ground stations 5 selected as the transmission destinations. Channel control communicator 71 transmits the channel designation notifications via ground network 6 to ground stations 5A selected by ground station selector 75A (ST-23A, ST-23B).

Figure 16:
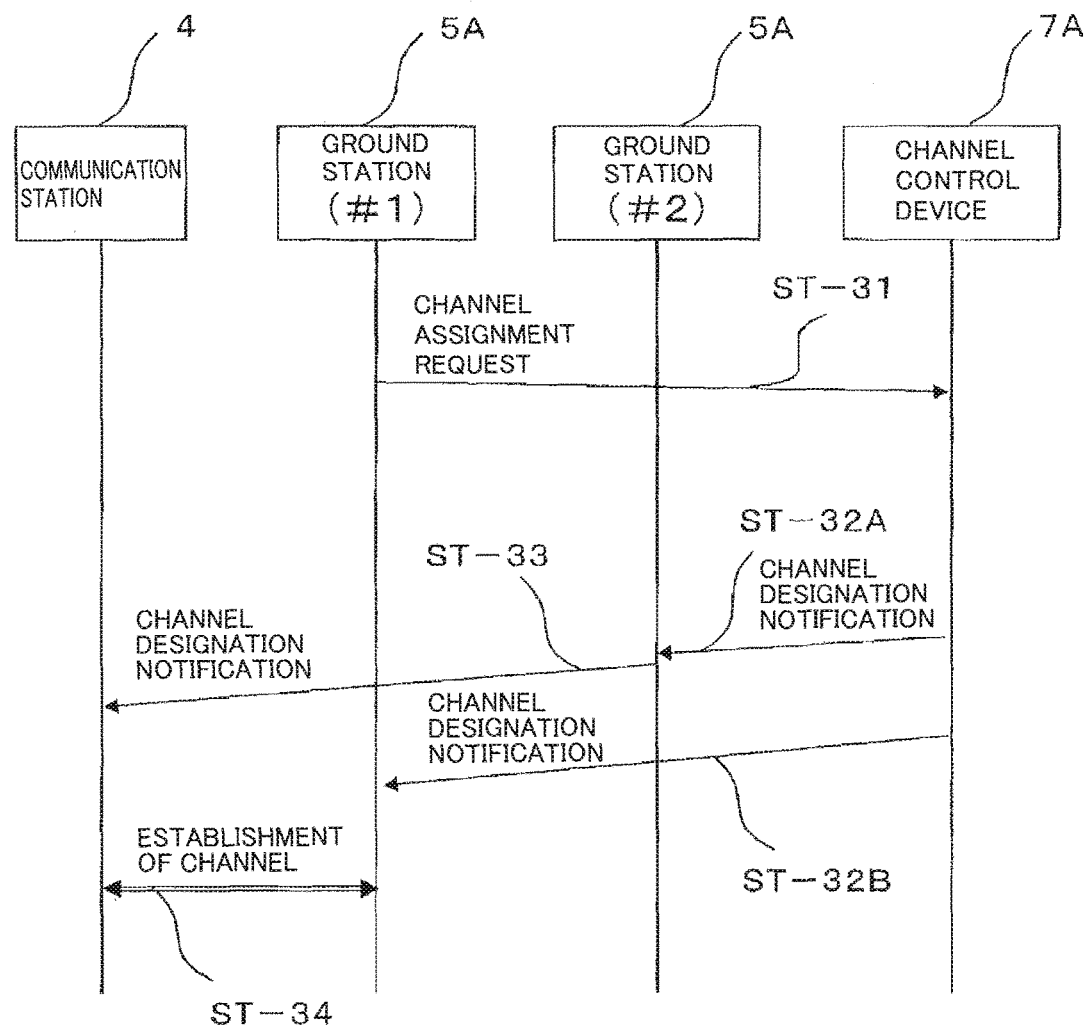
FIG. 16 is a sequence diagram for satellite communication channel connection in the satellite communication system according to the second embodiment of the present disclosure.

It should be noted that in the example of FIG. 12 to FIG. 15, it has been illustrated that the channel assignment request for communication between communication station 4 and ground station 5A (#1) is generated by communication station 4; however, the following describes a case where ground station 5A (#1) generates such a channel assignment request. FIG. 16 is a sequence diagram for satellite communication channel connection in the satellite communication system according to the second embodiment of the present disclosure. In FIG. 12, the channel assignment request is transmitted from communication station 4 to each of ground stations 5A (ST-21) and ground stations 5A transfer the received channel assignment requests to channel control device 7A (ST-22A, ST-22B). On the other hand, in FIG. 16, ground-related communicator 51A of ground station 5A (#1) transmits a channel assignment request generated by communication channel assignment request generator 54 to channel control device 7A via ground network 6 directly (ST-31).

In FIG. 16, in order to notify assigned satellite communication channel 2 to communication station 4 and ground station 5A (#1), channel control device 7A transmits the channel designation notifications via ground network 6 to ground station 5A connected to communication station 4 (#1) (FIG. 12 shows an example in which ground station 5A (#2) is selected for the purpose of notification to communication station 4) and ground station 5A (#1) (ST-32A, ST-32B). Ground station 5A (#2) receives the channel designation notification addressed to communication station 4, and relays the received channel designation notification to communication station 4. Moreover, ground station 5A (#1) receives the channel designation notification addressed to ground station 5A (#1) (ST-33). Communication station 4 and ground station 5A (#1) establish a communication channel through satellite communication channel 2 designated by the channel designation notifications (ST-34).

Figure 17:
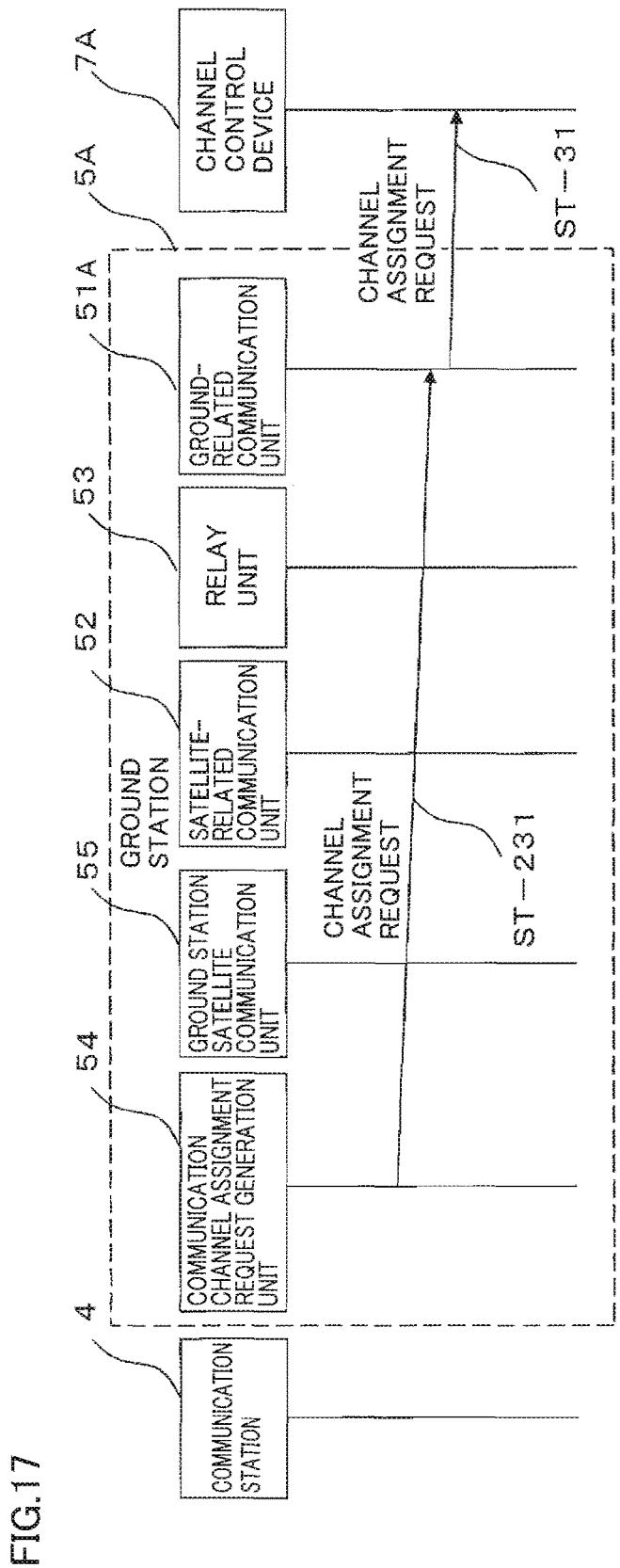
FIG. 17 is a sequence diagram for satellite communication channel connection for a ground station in the satellite communication system according to the second embodiment of the present disclosure.

FIG. 17 is a sequence diagram for satellite communication channel connection for the ground station in the satellite communication system according to the second embodiment of the present disclosure. FIG. 17 shows an operation in ground station 5A when transmitting the channel assignment request generated by ground station 5A to channel control device 7A (ST-31) in the procedure shown in FIG. 16. In ground station 5A, communication channel assignment request generator 54 generates a channel assignment request to request satellite communication channel 2 for communication with communication station 4 (ST-231), and ground-related communicator 51A directly transmits the generated channel assignment request to channel control device 7A via ground network 6 (ST-31). An operation of channel control device 7A having received the channel assignment request, an operation of channel control device 7A transmitting channel control notifications to ground station 5A (#1) and ground station 5A (#2), an operation of ground station 5A (#2) transmitting a channel designation notification to communication station 4, and an operation of establishing a communication channel between communication station 4 and ground station 5A (#1) through satellite communication channel 2 designated by the channel designation notifications are completely the same as those in FIG. 12.

As described above, according to the second embodiment of the present disclosure, ground station 5A is capable of performing communication with communication station 4 through satellite communication channel 2 in addition to the function of relaying a control signal between communication station 4 and channel control device 7A. This communication function can be used for settings or the like of ground station 5A. In addition to the effect of the first embodiment, this facilitates maintenance and reconstruction of the satellite communication system and facilitates service to be continued in ground station 5A even in the event of a disaster or the like.

Third Embodiment

Figure 18:
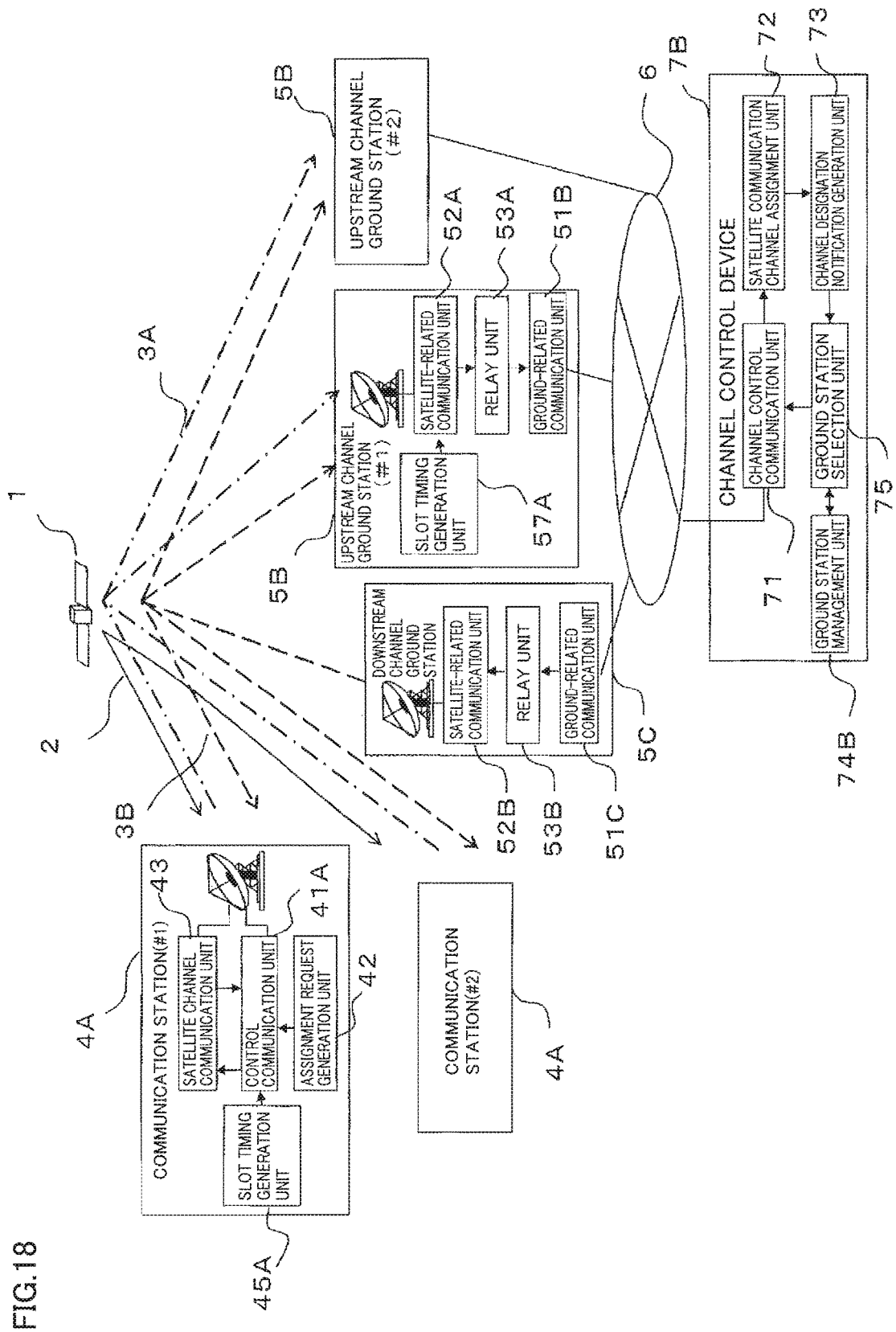
FIG. 18 shows a configuration of a satellite communication system according to a third embodiment of the present disclosure.

FIG. 18 shows a configuration of a satellite communication system according to a third embodiment of the present disclosure. In FIG. 18, satellite control channel 3 is illustrated as channels divided in accordance with directions of transmitted and received control signals, specifically, is illustrated as (i) an upstream satellite control channel 3A from a communication station to a ground station and (ii) a downstream satellite control channel 3B from a ground station to a communication station. Since upstream satellite control channel 3A is employed for transmission from a plurality of communication stations, control signals need to be transmitted and received in accordance with the Slotted ALOHA communication scheme employing a common time slot between the communication station and the ground station. On the other hand, downstream satellite control channel 3B is employed only for transmission from a ground station. Hence, ground station 5 can perform transmission without using a time slot by configuring such that the same ground station always employs its corresponding channel for transmission. A timing signal serving as a reference of the time slot is transmitted from a ground station 5, which always transmits a signal, and the communication station and the ground station performs transmission and reception through upstream satellite control channel 3A in accordance with the time slot in synchronization with the timing signal.

Control for assignment and release of satellite communication channel 2 is performed in accordance with control signals transmitted/received through upstream satellite control channel 3A and downstream satellite control channel 3B. The satellite communication system according to the third embodiment of the present disclosure includes: a communication station 4A, which is also referred to as "earth station", configured to communicate through satellite communication channel 2; a plurality of upstream channel ground stations 5B each configured to receive a control signal transmitted by communication station 4A through upstream satellite control channel 3A and transmit it to a channel control device 7B; a downstream channel ground station 5C configured to transmit, to communication station 4A through downstream satellite control channel 3B, a control signal sent from channel control device 7B; and channel control device 7B configured to communicate with upstream channel ground station 5B and downstream channel ground station 5C via ground network 6. It should be noted that FIG. 18 illustrates two communication stations 4A, two upstream channel ground stations 5B, and one downstream channel ground station 5C; however, the numbers of them may be any numbers and are not limited to the numbers described in the figure. Moreover, a computer serving as a backup of channel control device 7B may be connected to ground network 6.

As described above, since communication station 4A transmits a control signal through upstream satellite control channel 3A, communication station 4A is different from communication station 4 in that communication station 4A has no navigation signal receiver and communication station 4A always receives electric wave transmitted from downstream channel ground station 5C. Moreover, upstream channel ground station 5B receives a timing signal transmitted from downstream channel ground device 5C through the downstream satellite control channel and serving as a reference of time slot, and receives a control signal from communication station 4A through upstream satellite control channel 3A. Channel control device 7B is different from channel control device 7 and channel control device 7A in that channel control device 7B records upstream channel ground station 5B and downstream channel ground station 5C separately and transmits, to downstream channel ground station 5C, a channel designation notification addressed to communication station 4A.

As with the first and second embodiments, satellite communication channel 2 is constituted of subdivided channels such as #1 to #m occupying different frequency bands as shown in FIG. 3. Likewise, satellite control channel 3 is constituted of subdivided channels such as #1 to #n occupying different frequency bands as shown in FIG. 3. Each of (i) upstream satellite control channel 3A for transmitting, from communication station 4A to upstream channel ground station 5B, a control signal directed to channel control device 7 and (ii) downstream satellite control channel 3B for transmitting, from downstream channel ground station 5C to communication station 4A, a control signal sent from channel control device 7 is assigned to any one of the subdivided channels such as #1 to #n.

For each of the channels occupying the respective frequency bands, a time slot, which is a division of time with a certain interval, is provided and the Slotted ALOHA communication scheme utilizing this time slot is employed. The same time slot is shared among the plurality of communication stations 4A and upstream channel ground station 5B, which use upstream satellite control channel 3A of the same frequency band. By using this time slot, the plurality of communication stations 4A can transmit control signals to upstream channel ground station 5B through upstream satellite control channel 3A occupying the same frequency band.

On the other hand, no time slot is defined for downstream satellite control channel 3B and a control signal is transmitted by one downstream channel ground station 5C, which is determined for each channel assigned to downstream satellite control channel 3B and subdivided into one of frequency bands #1 to #n in FIG. 2. Downstream channel ground station 5C always transmits a carrier at a specific frequency band of downstream satellite control channel 3B. Each of communication station 4A and upstream channel ground station 5B receives the carrier always transmitted by downstream channel ground station 5C, and generates a time slot for upstream satellite control channel 3A based on a synchronization signal (slot start timing) included in the received carrier. This is different from the first and second embodiments in each of which the time slot is generated based on navigation signal 9 from navigation satellite 8.

When starting a communication via satellite communication channel 2, communication station 4A transmits an assignment request to request assignment of satellite communication channel 2 though upstream satellite control channel 3. Communication station 4A receives a channel designation notification, which is a response to the assignment request, through downstream satellite control channel 3 and communicates with a different communication station 4A through satellite communication channel 2 designated by the channel designation notification. Moreover, communication station 4A receives a slot start timing transmitted by downstream channel ground station 5C, and transmits an assignment request to request assignment of satellite communication channel 2 in accordance with the Slotted ALOHA communication scheme through upstream satellite control channel 3A using the slot starting with the slot start timing.

Each of the plurality of upstream channel ground stations 5B is connected to channel control device 7 via ground network 6. Communication station 4A transmits a control signal to each of upstream channel ground stations 5B through upstream satellite control channel 3A. The control signal transmitted by communication station 4A through upstream satellite control channel 3A is received by each of the plurality of upstream channel ground stations 5B.

The plurality of upstream channel ground stations 5B receive the control signals through upstream satellite control channel 3A of the same frequency band. Hence, even if a specific upstream channel ground station 5B becomes unusable, another upstream channel ground station 5B, which receives a control signal through the same channel, receives the control signal transmitted from communication station 4A. Such a structure ensures that satellite communications service can be continued even if a specific upstream channel ground station 5B becomes unusable due to a disaster or the like. Each of upstream channel ground stations 5B relays between upstream satellite control channel 3A and ground network 6. Ground station 5B receives an assignment request transmitted by communication station 4A through upstream satellite control channel 3A, and transmits it to channel control device 7B via ground network 6.

One downstream channel ground station 5C is provided for each of the channels subdivided into frequency bands #1 to #n of downstream satellite control channel 3B in FIG. 2, and is connected to channel control device 7B via ground network 6. Downstream channel ground station 5C transmits control signals to a plurality of communication stations 4A through downstream satellite control channel 3B. Moreover, downstream channel ground station 5C transmits a slot start timing of time slot for communication between communication station 4A and upstream channel ground station 5B through upstream satellite control channel 3A in accordance with the Slotted ALOHA communication scheme. Downstream channel ground station 5C receives a channel designation notification from channel control device 7B via ground network 6, and transmits it to communication station 4A through downstream satellite control channel 3B.

Channel control device 7B is constructed of a general-purpose computer or the like, and is connected to each of upstream channel ground station 5B and downstream channel ground station 5C via ground network 6.

From respective upstream channel ground stations 5B connected to communication station 4A through upstream satellite control channel 3A, channel control device 7B receives channel assignment requests identical to that originated from communication station 4A. Among the received channel assignment requests, channel control device 7B determines that channel assignment requests originated from the same communication station 4A are identical channel assignment requests. Channel control device 7B assigns satellite communication channel 2 in response to the channel assignment requests determined to be identical channel assignment requests. Channel control device 7B generates a channel designation notification for notifying assigned satellite communication channel 2 to communication station 4.

When a channel assignment request is made to request assignment of satellite communication channel 2 used for communication between communication station 4A (#1) and communication station 4A (#2) of the plurality of communication stations 4A, channel designation notifications will be provided to communication station 4A (#1) and communication station 4A (#2) in response to the channel assignment request. Channel control device 7B selects downstream channel ground station 5C that is configured to transmit a control signal through the channel of the same frequency band in downstream satellite control channel 3B through which each of communication station 4A (#1) and communication station 4A (#2) receives a control signal. Then, channel control device 7B transmits the channel designation notifications to communication stations 4A (4A (#1), 4A (#2)) via the selected downstream channel ground station 5C. When communication station 4A (#1) and communication station 4A (#2) receive the control signals through the same channel, the same downstream channel ground station 5C is selected as a relay destination.

The following describes respective configurations of communication station 4A, upstream channel ground station 5B, downstream channel ground station 5C, and channel control device 7B, each of which performs the functions described above in the satellite communication system shown in FIG. 18. Communication station 4A includes a control communicator 41A, an assignment request generator 42, a satellite channel communicator 43, and a slot timing generator 45A. They are the same configurations as those included in communication station 4, except for control communicator 41A and slot timing generator 45A. Control communicator 41A transmits a control signal to upstream channel ground station 5B through upstream satellite control channel 3A using the time slot started with the timing signal generated by slot timing generator 45A. Based on a start timing slot, slot timing generator 45A generates a timing of start of time slot for control communicator 41A transmitting a control signal to upstream channel ground station 5 through upstream satellite control channel 3A. The start timing slot is a synchronization signal received by control communicator 41A from downstream channel ground station 5C through downstream satellite control channel 3B.

Upstream channel ground station 5B has a ground-related communicator 51B, a satellite-related communicator 52A, a relay 53A, and a slot timing generator 57A. Satellite-related communicator 52A receives a control signal, such as a channel assignment request, from communication station 4A through upstream satellite control channel 3A, and receives a slot start timing through downstream satellite control channel 3B. The slot start timing is a synchronization signal transmitted by downstream channel ground station 5C. Based on a time slot started by a timing signal generated based on the slot start timing received from downstream channel ground station 5C through downstream satellite control channel 3B, satellite-related communicator 52A receives a control signal, such as a channel assignment request, from communication station 4A through upstream satellite control channel 3A. Based on the slot start timing received by satellite-related communicator 52A, slot timing generator 57A generates a timing for starting a time slot for communication between satellite-related communicator 52A and communication station 4A through upstream satellite control channel 3A. Ground-related communicator 51A is configured to communicate with channel control device 7 via ground network 6. Relay 53A transmits, via ground-related communicator 51B, the control signal received by satellite-related communicator 52A and addressed to channel control device 7.

It should be noted that communication station 4A transmits/receives a control signal to/from channel control device 7B, and is therefore connected to at least one upstream channel ground station 5B. In particular, the plurality of upstream channel ground stations 5B are each configured to receive a control signal from communication station 4A through upstream satellite control channel 3A when the satellite communication system is required to continue its service even if an upstream channel ground station 5B connected thereto becomes unusable due to a disaster or the like.

Downstream channel ground station 5C includes: a ground-related communicator 51C configured to communicate with channel control device 7B via ground network 6; a satellite-related communicator 52B configured to transmit the control signal to communication station 4B through downstream satellite control channel 3B; and a relay 53B configured to relay the control signal received by ground-related communicator 51C to satellite-related communicator 2B. Moreover, satellite-related communicator 52B always transmits a slot start timing, which is a synchronization signal for time slot when communication station 4A and upstream channel ground station 5B communicate with each other through upstream satellite control channel 3A in accordance with the Slotted ALOHA communication scheme.

Channel control device 7B includes a channel control communicator 71, a satellite communication channel assignor 72, a channel designation notification generator 73, a ground station manager 74B, and a ground station selector 75. Channel control device 7B has the same configuration as that of channel control device 7 except that ground station manager 74B records upstream channel ground station 5B and downstream channel ground station 5C for communicating with communication stations 4A.

Figure 19:
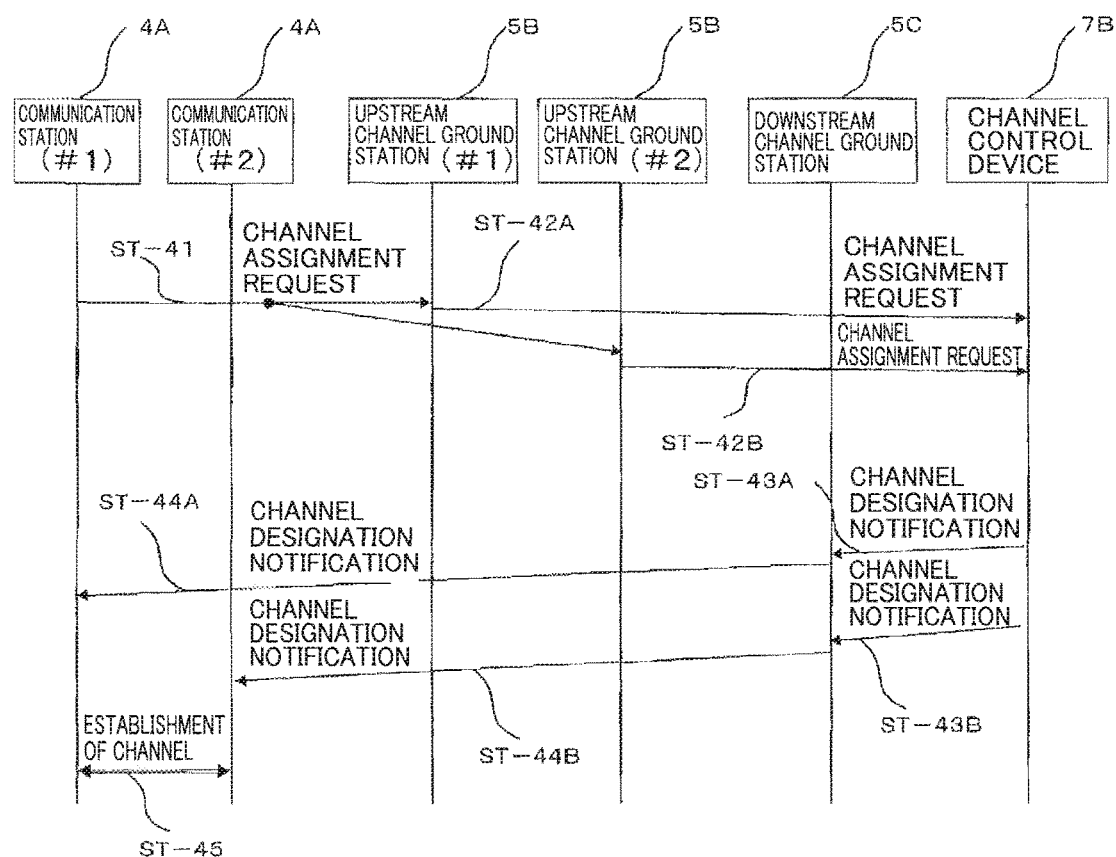
FIG. 19 is a sequence diagram for satellite communication channel connection in the satellite communication system according to the third embodiment of the present disclosure.

The following describes operations. FIG. 19 is a sequence diagram for satellite communication channel connection in the satellite communication system according to the third embodiment of the present disclosure. FIG. 19 shows an exemplary procedure for connection of satellite communication channel 2 for communication between communication station 4A (#1) and counterpart communication station 4A (#2) in the configuration of FIG. 18. Communication station 4A (#1) and communication station 4A (#2) transmit signals necessary for channel control, such as channel requests, to upstream channel ground station 5B (#1) and upstream channel ground station 5B (#2) through upstream satellite control channel 3A.

For communication between communication station 4A (#1) and communication station 4A (#2) through satellite communication channel 2, communication station 4A (#1) transmits a channel assignment request to each of upstream channel ground station 5B (#1) and upstream channel ground station 5B (#2) through upstream satellite control channel 3A so as to request satellite communication channel 2 for communication with the counterpart communication station (communication station 4A (#2)) (ST-41). Upstream channel ground station 5B (#1) and upstream channel ground station 5B (#2) transmit the received channel assignment requests to channel control device 7B via ground network 6 (ST-42A, ST-42B).

Channel control device 7B determines that the plurality of channel assignment requests transmitted from upstream channel ground station 5B (#1) and upstream channel ground station 5B (#2) and originated from the same communication station 4A (#1) are identical channel assignment requests, and assigns, in response to a collected set of the channel assignment requests thus determined to be identical, one of those as represented by #1 to #n in satellite communication channel 2 in FIG. 2. In order to notify assigned satellite communication channel 2 to communication station 4A (#1) and communication station 4A (#2), channel control device 7B transmits the channel designation notifications via ground network 6 to downstream channel ground station 5C connected to communication station 4A (#1) and communication station 4A (#2) (ST-43A, ST-43B).

Downstream channel ground station 5C receives the channel designation notifications addressed to communication station 4 (#1) and communication station 4 (#2) and transmits the respective channel designation notifications to communication station 4A (#1) and communication station 4A (#2) through downstream satellite control channel 3B (ST-44A, ST-44B). Communication station 4A (#1) and communication station 4A (#2) establish a communication channel through satellite communication channel 2 designated by the channel designation notifications received through downstream satellite control channel 3B (ST-45).

FIG. 20 is a sequence diagram for satellite communication channel connection for communication station 4A in the satellite communication system according to the third embodiment of the present disclosure. FIG. 20 (a) shows an operation in communication station 4A when transmitting a channel assignment request from communication station 4A to upstream channel ground station 4B in FIG. 19 (ST-41). FIG. 20 (b) shows an operation in each of communication stations 4A when receiving channel designation notifications (ST-44A, ST-44B) and establishing a channel (ST-45) in FIG. 19. In FIG. 20 (a), in communication station 4A, assignment request generator 42 generates a channel assignment request to request assignment of satellite communication channel 2 for communication with a counterpart communication station (communication station 4 (#2) in the case of communication station 4 (#1)) (ST-301). The channel assignment request includes: information about communication station 4A (#2) serving as a counterpart communication station with which communication station 4A (#1) is to communicate; and identification information indicating which ones of a plurality of channel assignment requests received by channel control device 7B through the plurality of ground stations 5 are identical. Identification information is unique identification information generated whenever a channel assignment request is generated in communication station 4A. Examples of the identification information include: the address of the terminal of communication station 4A; and a combination of pieces of information such as a random number and time. Control communicator 41A transmits the channel assignment request generated by assignment request generator 42 to ground station 5B (#1) and ground station 5B (#2) through upstream satellite control channel 3A (ST-41).

In FIG. 20 (b), in communication station 4A (#1), control communicator 41A receives the channel designation notification transmitted from ground station 5C (ST-44A). Control communicator 41A sends, to satellite channel communicator 43, the channel information of satellite communication channel 2 designated by the received channel designation notification (ST-303). Likewise, in communication station 4A (#2), assigned satellite communication channel 2 is designated in accordance with the channel designation notification transmitted from ground station 5C in ST-44B. Satellite channel communicator 43 communicates with communication station 4A (#2) through designated satellite communication channel 2 (ST-45).

FIG. 21 is a sequence diagram for satellite communication channel connection for upstream channel ground station 5B and downstream channel ground station 5C in the satellite communication system according to the third embodiment of the present disclosure. FIG. 21 (a) shows an operation in upstream channel ground station 5B when transmitting, to channel control device 7B, the channel assignment request received from communication station 4A (ST-42A) in FIG. 19. FIG. 21 (b) shows an operation in downstream channel ground station 5C when transmitting, to communication station 4A, the channel designation notification received from channel control device 7B (ST-44A) in FIG. 19.

In FIG. 21 (a), in upstream channel ground station 5B, satellite-related communicator 52A receives, through upstream satellite control channel 3A, the channel assignment request originated from communication station 4A (ST-41A). Satellite-related communicator 52A transmits the received channel assignment request to the relay (ST-311). Relay 53A converts the channel assignment request serving as the control signal received by satellite-related communicator 52A into a message for the ground network, and sends it to ground-related communicator 51 with the message being addressed to channel control device 7 (ST-312). Ground-related communicator 51B adds, to the channel assignment request obtained from relay 53A, time (ground station reception time) at which this channel assignment request is received by satellite-related communicator 52A, and transmits it to channel control device 7B via ground network 6 (ST-42A).

In FIG. 21 (b), in downstream channel ground station 5C, ground-related communicator 51C receives the channel designation notification from channel control device 7B via ground network 6 (ST-43A). Ground-related communicator 51C transmits the received channel designation notification to relay 53B (ST-314). Relay 53B converts the channel designation notification received by ground-related communicator 51C into a control signal for downstream satellite control channel 3B, and transmits it to satellite-related communicator 52B (ST-315). Satellite-related communicator 52B transmits the channel designation notification obtained from relay 53, to communication station 4 through downstream satellite control channel 3B (ST-44A).

Figure 22:
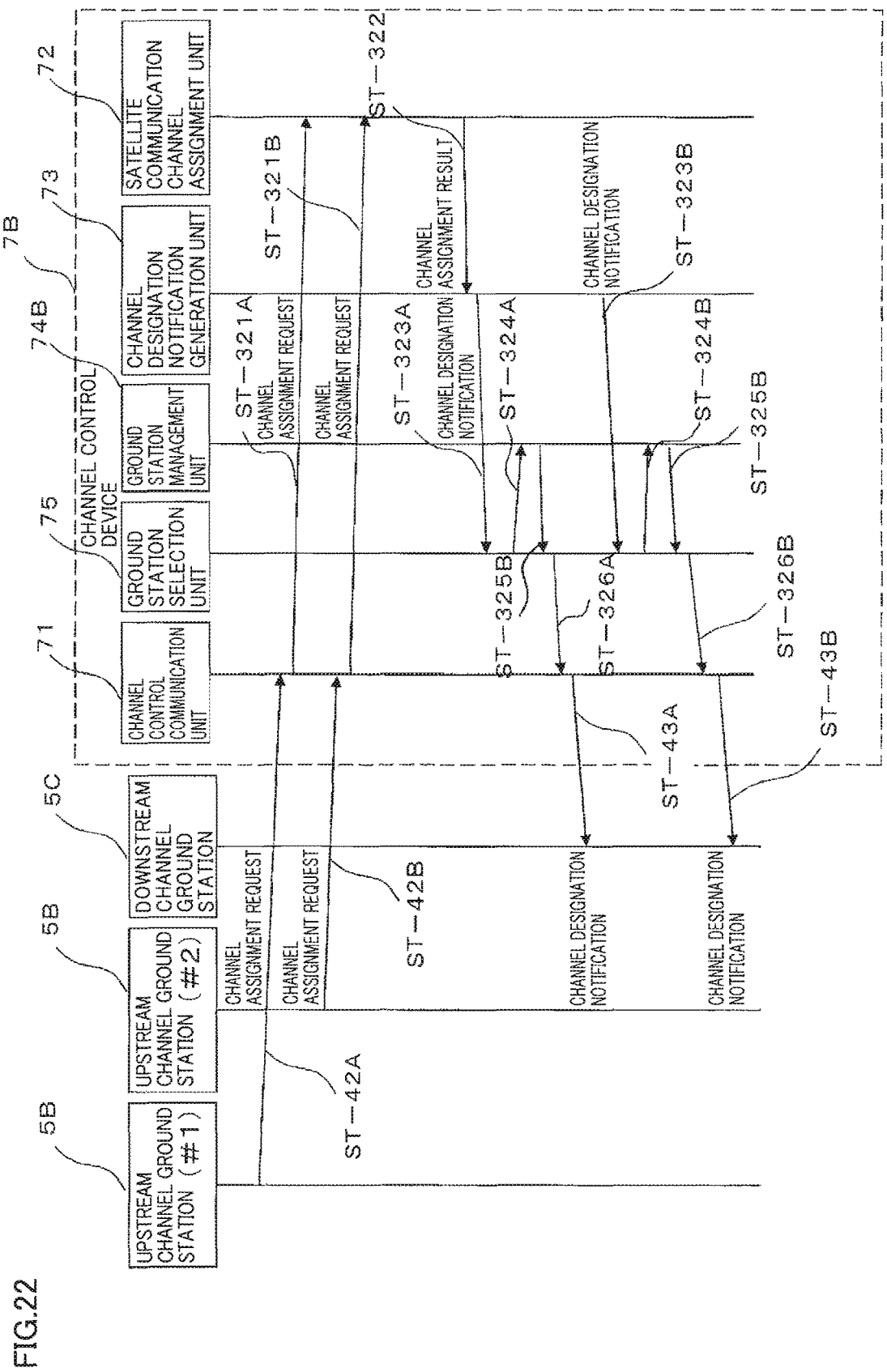
FIG. 22 is a sequence diagram for satellite communication channel connection for a channel control device in the satellite communication system according to the third embodiment of the present disclosure.

FIG. 22 is a sequence diagram for satellite communication channel connection for channel control device 7B in the satellite communication system according to the third embodiment of the present disclosure. FIG. 22 shows an operation in channel control device 7B when transmitting the channel designation notification to downstream channel ground station 5C (ST-43A, ST-43B) in the procedure shown in FIG. 19. In FIG. 22, in channel control device 7B, channel control communicator 71 receives channel assignment requests from upstream channel ground station 5B (#1) and upstream channel ground station 5B (#2) via ground network 6 (ST-42A, ST-42B). Channel control communicator 71 sends the received channel assignment requests to satellite communication channel assignor 72 (ST-321A, ST-321B). When satellite communication channel assignor 72 receives a plurality of identical channel assignment requests sent from channel control communicator 71 (ST-321A, ST-321B), satellite communication channel assignor 72 determines that channel assignment requests from the same communication station 4A (#1) are identical channel assignment requests, based on the following facts: pieces of identification information included in the channel assignment requests and added by communication station 4A (#1) are identical; and a difference between ground station reception times included in the channel assignment requests and added by upstream channel ground station 5B (#1) and upstream channel ground station 5B (#2) falls within a range of predetermined certain period of time. Then, satellite communication channel assignor 72 assigns satellite communication channel 2. Satellite communication channel assignor 72 transmits, to channel designation notification generator 73, pieces of information of assigned satellite communication channel 2, communication station 4A (#1) having transmitted the channel assignment request, and counterpart communication station 4A (#2) (ST-322).

When channel designation notification generator 73 obtains (i) satellite communication channel 2 assigned by satellite communication channel assignor 72 and (ii) communication stations 4A (communication station 4A (#1) and communication station 4A (#2)) to which assigned satellite communication channel 2 is notified, channel designation notification generator 73 generates channel designation notifications addressed to communication station 4 (#1) and communication station 4 (#2) (ST-323A, ST-323B).

For each of communication stations 4A to be provided with the channel designation notifications, ground station selector 75 makes an inquiry to ground station manager 74A as to a downstream channel ground station 5C connected to communication station 4A through downstream satellite control channel 3B (ST-324A, ST-324B), and obtains that downstream channel ground station 5C (ST-325A, ST-325B). Ground station selector 75 determines the obtained ground station 5C as a transmission destination of the channel designation notifications, and instructs channel control communicator 71 to transmit the channel designation notifications to ground station 5C selected as the transmission destination (ST-326A, ST-326B). Channel control communicator 71 transmits the channel designation notifications via ground network 6 to downstream channel ground station 5C selected by ground station selector 75 (ST-43A, ST-43B).

Figure 23:
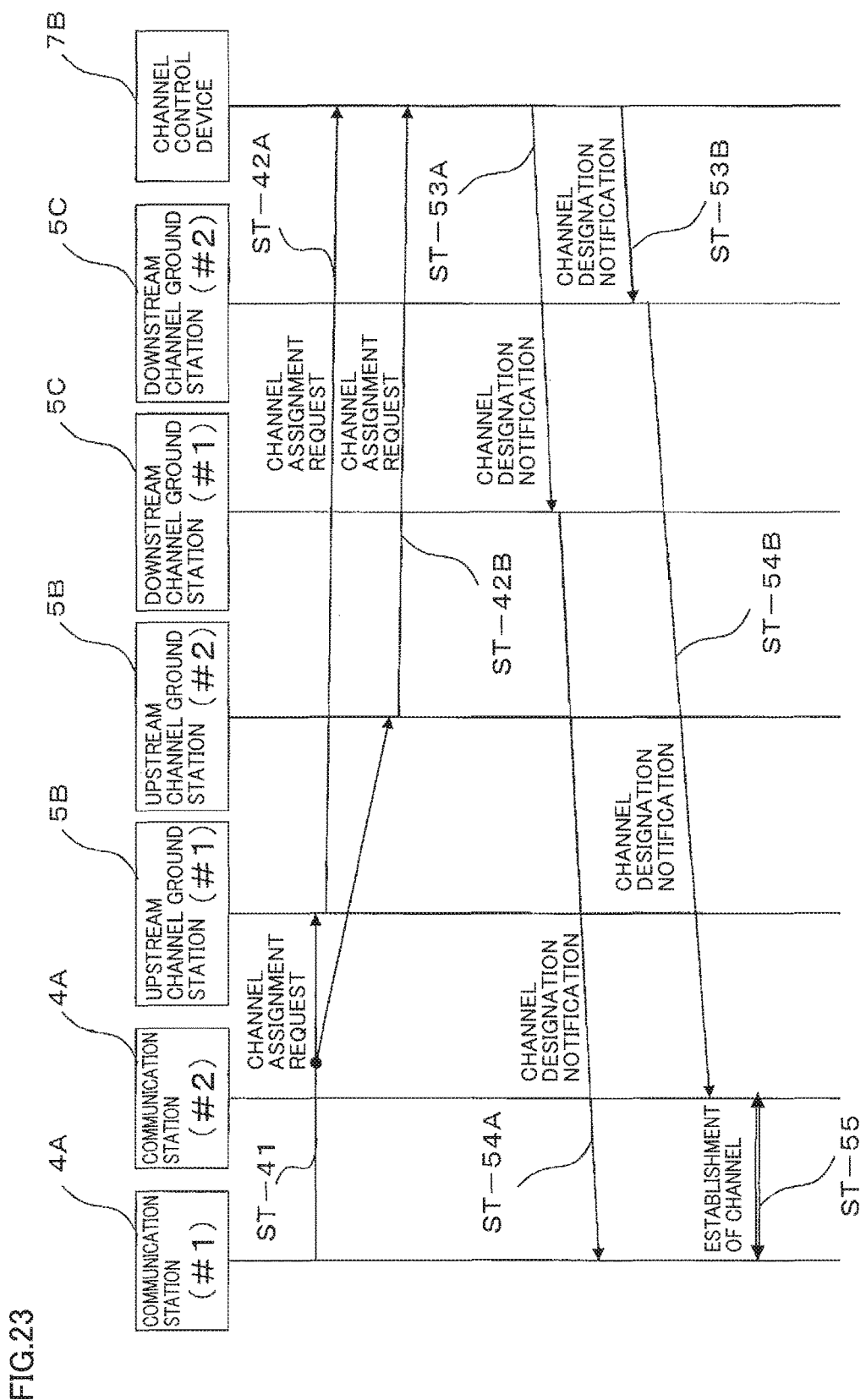
FIG. 23 is a sequence diagram for satellite communication channel connection in the satellite communication system according to the third embodiment of the present disclosure.

FIG. 23 is a sequence diagram for satellite communication channel connection in the satellite communication system according to the third embodiment of the present disclosure. FIG. 23 shows another exemplary procedure of connection of satellite communication channel 2 for communication between communication station 4A (#1) and communication station 4A (#2) in the configuration of FIG. 18. FIG. 23 shows a case where communication station 4A (#1) and communication station 4A (#2) are respectively connected to different downstream channel ground stations (for example, downstream channel ground station 5C (#1) and downstream channel ground station 5C (#2)) through downstream satellite control channels 3B. For example, such a situation corresponds to the following case: communication station 4A (#1) and communication station 4A (#2) can receive via different downstream satellite control channels 3B and no downstream channel ground station 5C capable of transmitting a control signal exists in both downstream satellite control channel 3B via which communication station 4A (#1) can receive and downstream satellite control channel 3B via which communication station 4A (#2) can receive.

In FIG. 23, the operations of transmitting a channel assignment request from communication station 4A to upstream channel ground station 5B (ST-41) and transmitting the channel assignment request received by upstream channel ground station 5B to channel control device 7B (ST-42A, ST-42B) are the same as those of FIG. 19. Channel control device 7B receives, via ground network 6, the channel assignment request transmitted from each of upstream channel ground station 5B (#1) and upstream channel ground station 5B (#2). Channel control device 7B determines that the plurality of channel assignment requests are identical channel assignment requests, and assigns satellite communication channel 2 in response to the channel requests. In order to notify assigned satellite communication channel 2 to communication station 4B (#1) and communication station 4B (#2), channel control device 7 transmits channel designation notifications via ground network 6 to ground stations 5D connected to communication station 4B (#1) and communication station 4B (#2) (FIG. 23 illustrates an example in which ground station 5D (#1) and ground station 5D (#2) are selected) (ST-53A, ST-53B).

Ground station 5C (#1) and ground station 5C (#2) respectively receive the channel designation notification addressed to communication station 4A (#1) and the channel designation notification addressed to communication station 4A (#2), and respectively relays the received channel designation notifications to communication station 4A (#1) and communication station 4A (#2) (ST-54A, ST-54B). Accordingly, communication station 4A (#1) and communication station 4A (#2) establish a communication channel through satellite communication channel 2 designated by the channel designation notifications (ST-55). It should be noted that an operation in communication station 4A when transmitting a channel assignment request to upstream channel ground station 5B (ST-41) and an operation in communication station 4A when receiving a channel designation notification from downstream channel ground station 5C (ST-54A) and establishing a channel (ST-55) are the same as those in FIG. 20 (a) and FIG. 20 (b). An operation of upstream channel ground station 5B when transmitting, to channel control device 7B, a channel assignment request received from communication station 4A (ST-42A) is the same as that in FIG. 21 (a). Moreover, an operation in ground station 5C when transmitting, to communication station 4A, a channel designation notification received from channel control device 7B (ST-54A) is the same as that in FIG. 22B. An operation in channel control device 7B when transmitting a channel designation notification to downstream channel ground station 5C (ST-53) is the same as that in FIG. 22.

As described above, according to the third embodiment of the present disclosure, since one or more upstream channel ground stations 5B, each configured to receive a control signal from communication station 4A through upstream satellite control channel 3A, are connected to one communication station 4A, upstream channel ground station 5B can provide redundancy in transmitting/receiving a control signal through upstream satellite control channel 3A. Even if a local disaster or the like occurs, this redundancy enables communication to be continued unless all the upstream channel ground stations 5B connected to communication stations 4 become unusable.

Moreover, each of downstream channel ground stations 5C does not need to be capable of transmitting control signals through all the channels of downstream satellite control channel 3B as long as each of downstream channel ground stations 5B is capable of transmitting control signals through one or more channels of downstream satellite control channel 3. Hence, a large-scale transmission/reception facility does not need to be constructed. This facilitates providing redundancy by providing a spare downstream channel ground station 5C, and facilitates installing substitutive downstream channel ground stations 5C in case that a problem occurs in a part of downstream channel ground stations 5C. Also, channel control device 7B can be constructed on ground network 6 by using a general-purpose computer or the like. Hence, redundancy can be readily achieved by providing a spare channel control device 7B on ground network 6 or by constructing channel control device 7B using a plurality of computers on ground network 6. Accordingly, the satellite communication system can be obtained with which communication can be continued even in the event of a disaster.

Fourth Embodiment

In the third embodiment, communication station 4A and upstream channel ground station 5B transmit and receive control signals in accordance with the time slot of upstream satellite control channel 3A with the start timing being generated based on the control signal transmitted by downstream channel ground station 5C. On the other hand, in a fourth embodiment, each of communication station 4B and upstream channel ground station 5D receives navigation signal 9 transmitted by navigation satellite 8 and transmits/receives a control signal in accordance with a time slot started at a timing generated based on received navigation signal 9. With such a configuration, communication station 4B and upstream channel ground station 5D can transmit and receive control signals through upstream satellite control channel 3A irrespective of downstream channel ground station 5C. Hence, even if a problem occurs in part of downstream channel ground stations 5C, service can be continued.

Figure 24:
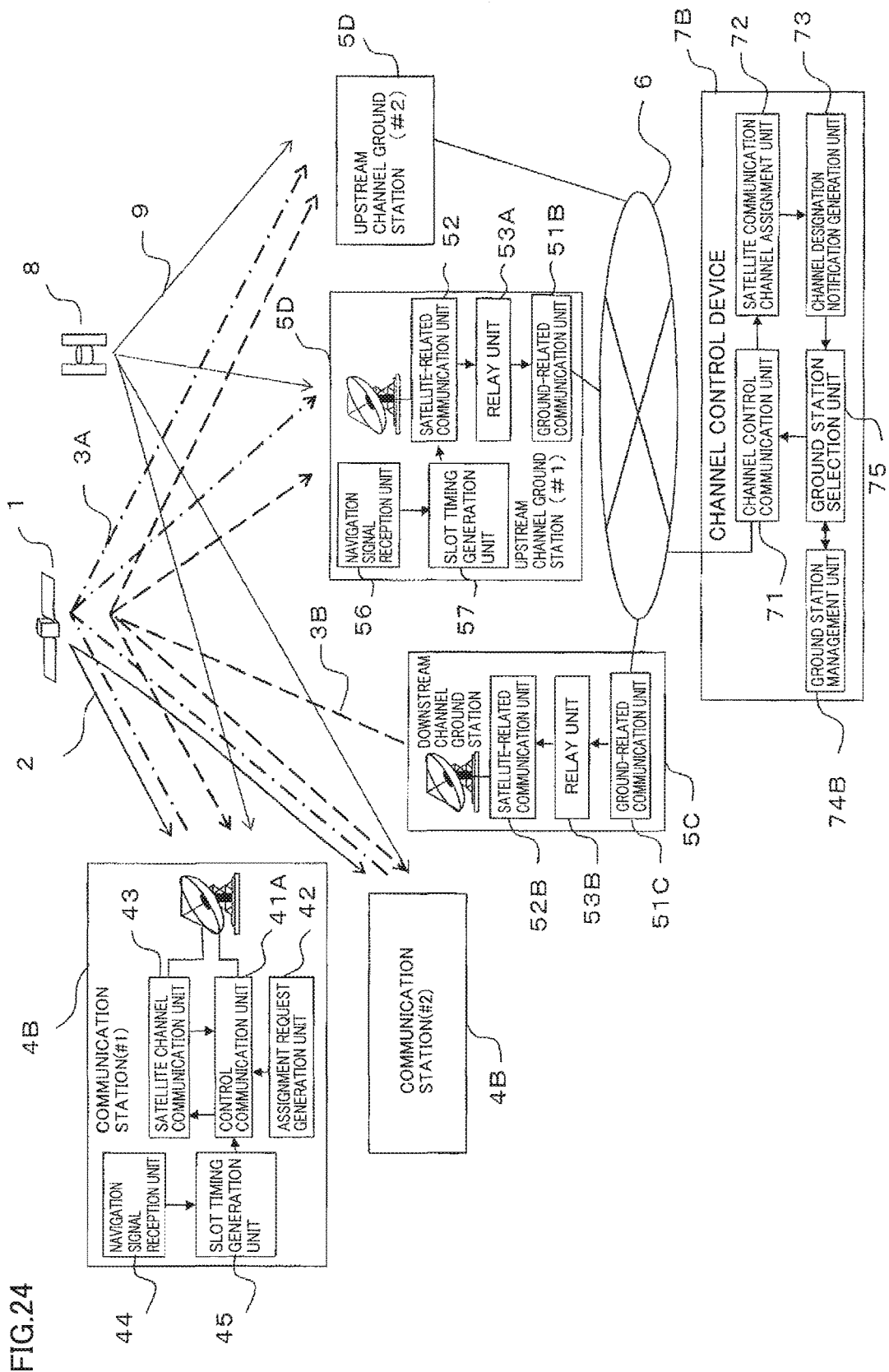
FIG. 24 shows a configuration of a satellite communication system according to a fourth embodiment of the present disclosure.

FIG. 24 shows a configuration of a satellite communication system according to the fourth embodiment of the present disclosure. The configuration of the satellite communication system shown in FIG. 24 is the same as the configuration of the satellite communication system shown in FIG. 18 except that instead of communication station 4A and upstream channel ground station 5B, the satellite communication system includes a communication station 4B and an upstream channel ground station 5D each configured to communicate through upstream satellite control channel 3A in accordance with the time slot that is based on navigation signal 9.

Communication station 4B includes a control communicator 41A, an assignment request generator 42, a satellite channel communicator 43, a navigation signal receiver 44, and a slot timing generator 45. The configuration of communication station 4B is the same as the configuration of communication station 4A except for navigation signal receiver 44 and slot timing generator 45. Moreover, navigation signal receiver 44 and slot timing generator 45 are the same as those in communication station 4 provided in each of the first and second embodiments. Communication station control communicator 41 transmits a control signal to upstream channel ground station 5B through upstream satellite control channel 3A in accordance with a slot started with a timing signal generated by slot timing generator 45.

Upstream channel ground station 5D includes a ground-related communicator 51B, a satellite-related communicator 52, a relay 53A, a navigation signal receiver 56, and a slot timing generator 57. The configuration of upstream channel ground station 5D is the same as the configuration of upstream channel ground station 5B except for navigation signal receiver 56 and slot timing generator 57. Moreover, navigation signal receiver 56 and slot timing generator 57 are the same as those provided in ground station 5 in each of the first and second embodiments. Satellite-related communicator 52A receives a control signal from communication station 4B through upstream satellite control channel 3A in accordance with a slot started with a timing signal generated by slot timing generator 57.

The procedure of connection of satellite communication channel 2 for communication between communication station 4B (#1) and communication station 4B (#2) serving as a counterpart communication station with which communication station 4B (#1) is to communicate in the configuration of FIG. 24 is completely the same as a procedure in which communication station 4A (#1) and communication station 4A (#2) are replaced with communication station 4B (#1) and communication station 4B (#2) in FIG. 19.

Moreover, the operation of communication station 4B in the configuration of FIG. 24 is completely the same as an operation in which communication station 4A is replaced with communication station 4B and upstream channel ground station 5B is replaced with upstream channel ground station 5D in FIG. 20 (a). Furthermore, the operation of upstream channel ground station 5D in the configuration of FIG. 24 is completely the same as an operation in which communication station 4A is replaced with communication station 4B and upstream channel ground station 5B is replaced with upstream channel ground station 5D in FIG. 21 (a).

As described above, according to the fourth embodiment of the present disclosure, since one or more upstream channel ground stations 5D, each configured to receive a control signal from communication station 4B through upstream satellite control channel 3A, are connected to one communication station 4B, redundancy can be provided in transmitting/receiving control signals through upstream satellite control channel 3A. Even if a local disaster or the like occurs, this redundancy enables communication to be continued unless all the upstream channel ground stations 5 connected to communication stations 4B become unusable.

The present disclosure can encompass various embodiments, an unrestricted combination of embodiments, modifications, or omission of embodiments without deviating from the broad sprit and scope of the present disclosure. Moreover, the embodiments described above are intended to illustrate the present disclosure, and are not intended to limit the scope of the present disclosure. Hence, the scope of the present disclosure is defined by the scope of claims rather than the embodiments. In addition, various modifications provided in the scope of claims and scope of equivalent meanings of the invention are deemed as falling within the scope of the present disclosure.

The present application claims a priority based on Japanese Patent Application No. 2014-025583 filed on Feb. 13, 2014 and including the specification, claims, drawings, and abstract. The disclosure of Japanese Patent Application No. 2014-025583 is entirely incorporated in the present application by reference.

REFERENCE SIGNS LIST

1: satellite
2: satellite communication channel
3: satellite control channel
3A: upstream satellite control channel
3B: downstream satellite control channel
4, 4A, 4B: communication station
5, 5A: ground station
5B, 5D: upstream channel ground station
5C: downstream channel ground station
6: ground network
7, 7A, 7B: channel control device
8: navigation satellite
9: navigation signal
41, 41A: control communicator
42: assignment request generator
43: satellite channel communicator
44, 56: navigation signal receiver
45, 45A, 57: slot timing generator
51, 51A, 51B, 51C: ground-related communicator
52, 52A, 52B: satellite-related communicator
53, 53A, 53B: relay
54: communication channel assignment request generator
55: ground station satellite communicator
71: channel control communicator
72: satellite communication channel assignor
73: channel designation notification generator
74, 74A, 74B: ground station manager
75, 75A: ground station selector

The invention claimed is:

1. A communication system comprising:
an assignment request generator to generate a channel assignment request to request assignment of a satellite communication channel for communication with a counterpart communication station via a satellite, the channel assignment request including a unique identifier based on a combination of a random number and time;
a control communicator to transmit the channel assignment request to each of a plurality of ground stations through a time slot of a satellite control channel via the satellite, the time slot being determined based on time information obtained from a navigation signal from a navigation satellite, the plurality of ground stations being connected to a channel control device via a ground network, the channel control device assigning the satellite communication channel; and
a satellite channel communicator to communicate with the counterpart communication station through the satellite communication channel assigned and notified in response to the channel assignment request received by the channel control device via each of the plurality of ground stations,
wherein the channel control device determines whether multiple channel assignment requests received by the channel control device from different ground stations originate from the same channel assignment request based on a time of receipt of the multiple channel assignment requests in the ground stations and the unique identifier.

2. The communication system according to claim 1, wherein when the channel control device determines that the multiple channel assignment requests are identical, one satellite communication channel is assigned for a set of the multiple received channel assignment requests determined to be identical.

3. The communication system according to claim 1, wherein
the control communicator receives, from a downstream channel ground station through the satellite control channel, a channel designation notification for notifying the satellite communication channel assigned by the channel control device, the downstream channel ground station being connected to the channel control device via the ground network, and
the satellite channel communicator communicates with the counterpart communication station through the satellite communication channel notified by the channel designation notification received by the control communicator.

4. The communication system according to claim 3, wherein
the control communicator receives, from a plurality of the downstream channel ground stations through the satellite control channel, the channel designation notifications including pieces of information about the counterpart communication station, and determines that the received channel designation notifications are identical when the channel designation notifications include identical pieces of information about the counterpart communication station, and
the satellite channel communicator communicates with the counterpart communication station through the satellite communication channel notified by the channel designation notifications determined to be identical.

5. A satellite communication system comprising:
a communication station including
an assignment request generator to generate a channel assignment request to request assignment of a satellite communication channel for communication with a counterpart communication station via a satellite, the channel assignment request including a unique identifier based on a combination of a random number and time,
a control communicator to transmit the channel assignment request through a time slot of a satellite control channel via the satellite, the time slot being determined based on time information obtained from a navigation signal of a navigation satellite, and a satellite channel communicator to communicate through the satellite communication channel assigned and notified in response to the channel assignment request;

a plurality of ground stations each including
a satellite-related communicator to receive the channel assignment request from the communication station through the time slot of the satellite control channel, and
a ground-related communicator to transmit, via a ground network, the channel assignment request received by the satellite-related communicator; and a channel control device including
a channel control communicator to communicate with the plurality of ground stations via the ground network, and
a satellite communication channel assignor to assign the satellite communication channel in response to the channel assignment requests received from the plurality of ground stations by the channel control communicator,
wherein the channel control device determines whether multiple channel assignment requests received by the channel control device from different ground stations originate from the same channel assignment request based on a time of receipt of the multiple channel assignment requests in the ground stations and the unique identifier.

6. The satellite communication system according to claim 5, wherein
the satellite communication channel assignor of the channel control device determines that the channel assignment requests received from the plurality of ground stations are identical when the channel assignment requests are originated from the same communication station and include the unique identifier.

7. The satellite communication system according to claim 5, wherein
the ground-related communicator of each of the ground stations adds ground station reception time to the channel assignment request and transmit the channel assignment request having the ground station reception time added thereto via the ground network, the ground station reception time being time at which the satellite-related communicator of the ground station receives the channel assignment request, and
the satellite communication channel assignor of the channel control device determines that the channel assignment requests received from the plurality of ground stations are identical when a difference between ground station reception times of the channel assignment requests falls within a predetermined range and the channel assignment requests are originated from the same communication station.

8. The satellite communication system according to claim 5, wherein
the channel control device further includes
a channel designation notification generator to generate a channel designation notification for notifying, to each of the communication station and the counterpart communication station, the satellite communication channel assigned by the satellite communication channel assignor of the channel control device, and
a ground station selector to select a downstream channel ground station for each of the communication station and the counterpart communication station, the downstream channel ground station transmitting a control signal through the satellite control channel, the downstream channel ground station being connected thereto via the ground network,
the channel control communicator of the channel control device transmits the channel designation notification via the ground network to the downstream channel ground station selected by the ground station selector of the channel control device, and
in the communication station, the control communicator receives the channel designation notification from the downstream channel ground station through the satellite control channel, and the satellite channel communicator communicates with the counterpart communication station through the satellite communication channel notified by the channel designation notification received by the control communicator.

9. The satellite communication system according to claim 8, wherein
the channel designation notification generator of the channel control device generates the channel designation notification to include information about the counterpart communication station,
the channel control communicator of the channel control device transmits the channel designation notification via the ground network to each of a plurality of the downstream channel ground stations selected for the communication station or the counterpart communication station by the ground station selector of the channel control device,
the control communicator of the communication station determines that the channel designation notifications received from the plurality of downstream channel ground stations through the satellite control channel by the control communicator are identical when the channel designation notifications includes identical pieces of information about the counterpart communication station, and
the satellite channel communicator of the communication station communicates with the counterpart communication station through the satellite communication channel indicated by a set of the channel designation notifications determined to be identical by the control communicator of the communication station.

10. The satellite communication system according to claim 5, wherein the satellite communication channel assignor determines whether or not the channel assignment requests received from the plurality of ground stations by the channel control communicator are identical, and assigns the satellite communication channel in response to a set of the channel assignment requests determined to be identical.

11. A communication system including a ground station, which is one of a plurality of ground stations, each of the plurality of ground stations receiving a channel assignment request through a time slot of a satellite control channel via a satellite, the channel assignment request including a unique identifier based on a combination of a random number and time, the time slot being determined based on time information obtained from a navigation signal from a navigation satellite, the channel assignment request being made by a communication station to request assignment of a satellite communication channel for communication with a counterpart communication station via the satellite, each of the plurality of ground stations transmitting the received channel assignment request to a channel control device via a ground network, the channel control device assigning the satellite communication channel in response to the channel assignment request, the ground station comprising:
a satellite-related communicator to receive the channel assignment request from the communication station through the satellite control channel; and
a ground-related communicator to transmit the channel assignment request received by the satellite-related communicator to the channel control device via the ground network,
wherein the channel control device determines whether multiple channel assignment requests received by the channel control device from different ground stations originate from the same channel assignment request based on a time of receipt of the multiple channel assignment requests in the ground stations and the unique identifier.

12. The communication system according to claim 11, wherein
the ground-related communicator adds ground station reception time to the channel assignment request received by the satellite-related communicator, and transmit the channel assignment request having the ground station reception time added thereto to the channel control device via the ground network, the ground station reception time being time at which the satellite-related communicator receives the channel assignment request.

13. A channel control device comprising:
a channel control communicator to receive, via a ground network, channel assignment requests from a plurality of ground stations connected thereto via the ground network, each of the channel assignment requests including a unique identifier based on a combination of a random number and time and each of the channel assignment requests being originated from a communication station to request assignment of a satellite communication channel for communication with a counterpart communication station via a satellite, the plurality of ground stations receiving the channel assignment requests through a time slot of a satellite control channel via the satellite, the time slot being determined based on time information obtained from a navigation signal from a navigation satellite; and
a satellite communication channel assignor to assign the satellite communication channel in response to the channel assignment requests received by the channel control communicator,
wherein the channel control device determines whether multiple channel assignment requests received by the channel control device from different ground stations originate from the same channel assignment request based on a time of receipt of the multiple channel assignment requests in the ground stations and the unique identifier.

14. The channel control device according to claim 13, wherein
the satellite communication channel assignor determines that the channel assignment requests received from the plurality of ground stations by the channel control communicator are identical when the channel assignment requests are originated from the same communication station and include the same unique identifier.

15. The channel control device according to claim 13, wherein each of the channel assignment requests has ground station reception time added thereto, the ground station reception time being time at which the ground station receives the channel assignment request, and
the satellite communication channel assignor determines that the channel assignment requests received from the plurality of ground stations by the channel control communicator are identical when a difference between ground station reception times of the channel assignment requests falls within a predetermined range and the channel assignment requests are originated from the same communication station.

16. The channel control device according to claim 13, further comprising:
a channel designation notification generator to generate a channel designation notification for notifying, to each of the communication station and the counterpart communication station, the satellite communication channel assigned by the satellite communication channel assignor; and
a ground station selector to select a downstream channel ground station for each of the communication station and the counterpart communication station, the downstream channel ground station transmitting the channel designation notification through the satellite control channel, the downstream channel ground station being connected thereto via the ground network, wherein
the channel control communicator transmits the channel designation notification to the downstream channel ground station via the ground network.

17. The channel control device according to claim 16, wherein the ground station selector selects a plurality of the downstream channel ground stations to transmit the channel designation notification to one of the communication station and the counterpart communication station through the satellite control channel.

18. The channel control device according to claim 14, wherein the satellite communication channel assignor determines whether or not the channel assignment requests received from the plurality of ground stations by the channel control communicator are identical, and assigns the satellite communication channel in response to a set of the channel assignment requests determined to be identical.

19. A satellite communication method comprising:
transmitting, by a communication station, a channel assignment request through a time slot of a satellite control channel via a satellite, the time slot being determined based on time information from a navigation signal from a navigation satellite, the channel assignment request being made to request assignment of a satellite communication channel for communication with a counterpart communication station via the satellite, the channel assignment request including a unique identifier based on a combination of a random number and time;
receiving, by each of a plurality of upstream ground stations, the channel assignment request through the time slot of the satellite control channel, the plurality of upstream ground stations being connected to a channel control device via a ground network, the channel control device assigning the satellite communication channel;
transmitting, by the plurality of upstream ground stations, the received channel assignment requests to the channel control device via the ground network;

assigning, by the channel control device, the satellite communication channel in response to the channel assignment requests;

generating, by the channel control device, a channel designation notification for notifying channel information about the assigned satellite communication channel to the communication station and transmitting, by the channel control device, the generated channel designation notification to a downstream channel ground station connected thereto via the ground network;

transmitting, by the downstream channel ground station, the channel designation notification received from the channel control device, to each of the communication station and the counterpart communication station through the satellite control channel; and receiving the channel designation notification by each of the communication station and the counterpart communication station, and communicating, by the communication station, with the counterpart communication station through the satellite communication channel designated by the channel designation notification, wherein multiple channel assignment requests received by the channel control device from different ground stations are determined to originate from the same channel assignment request based on a time of receipt of the multiple channel assignment requests in the ground stations and the unique identifier.

\* \* \* \* \*